United States Patent [19]
Yagoto et al.

[11] Patent Number: 6,008,552
[45] Date of Patent: Dec. 28, 1999

[54] LINEAR DRIVE DEVICE

[75] Inventors: Mitsutoshi Yagoto, Toyokawa; Katsuhiro Nanba, Okazaki; Masamitsu Ishiyama; Toshio Kitaoka, both of Toyokawa, all of Japan

[73] Assignee: Minolta Co., Ltd., Osaka, Japan

[21] Appl. No.: 09/001,120

[22] Filed: Dec. 30, 1997

[30] Foreign Application Priority Data

Dec. 30, 1996 [JP] Japan .................................... 8-357722
Nov. 14, 1997 [JP] Japan .................................... 9-312978

[51] Int. Cl.$^6$ ...................................................... H02K 41/00
[52] U.S. Cl. ................................................................ 310/12
[58] Field of Search ................................ 310/12, 13, 14; 318/135

[56] References Cited

FOREIGN PATENT DOCUMENTS

| | | |
|---|---|---|
| 5-62379 | 3/1993 | Japan . |
| 7107706 | 4/1995 | Japan . |
| 7181601 | 7/1995 | Japan . |

*Primary Examiner*—Nestor Ramirez
*Assistant Examiner*—Judson H. Jones
*Attorney, Agent, or Firm*—Sidley & Austin

[57] ABSTRACT

A linear drive device provided with a magnetic sensor which is movable together with a movable piece for reading magnetic information of a position sensing magnetized portion on a stator, and a magnetic shield member for shielding the magnetic sensor from a magnetic flux applied by a drive magnetized portion on the stator. A linear drive device provided with a first sensor for sensing a variation in magnetic polarity of a field magnet on a stator, and a second sensor for reading information on an encoder scale, the first and second sensors being arranged at positions in a region around the stator except for a region above the upper surface of the stator.

30 Claims, 15 Drawing Sheets

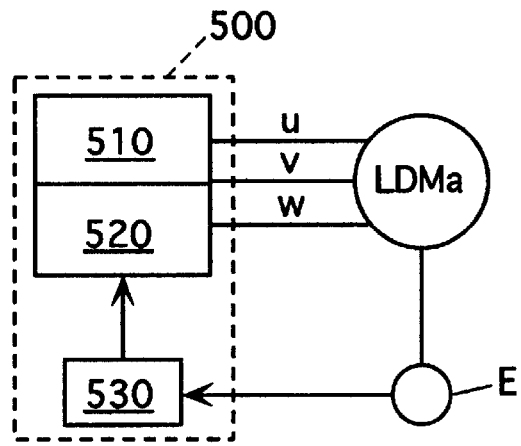
Fig.2
Fig.3
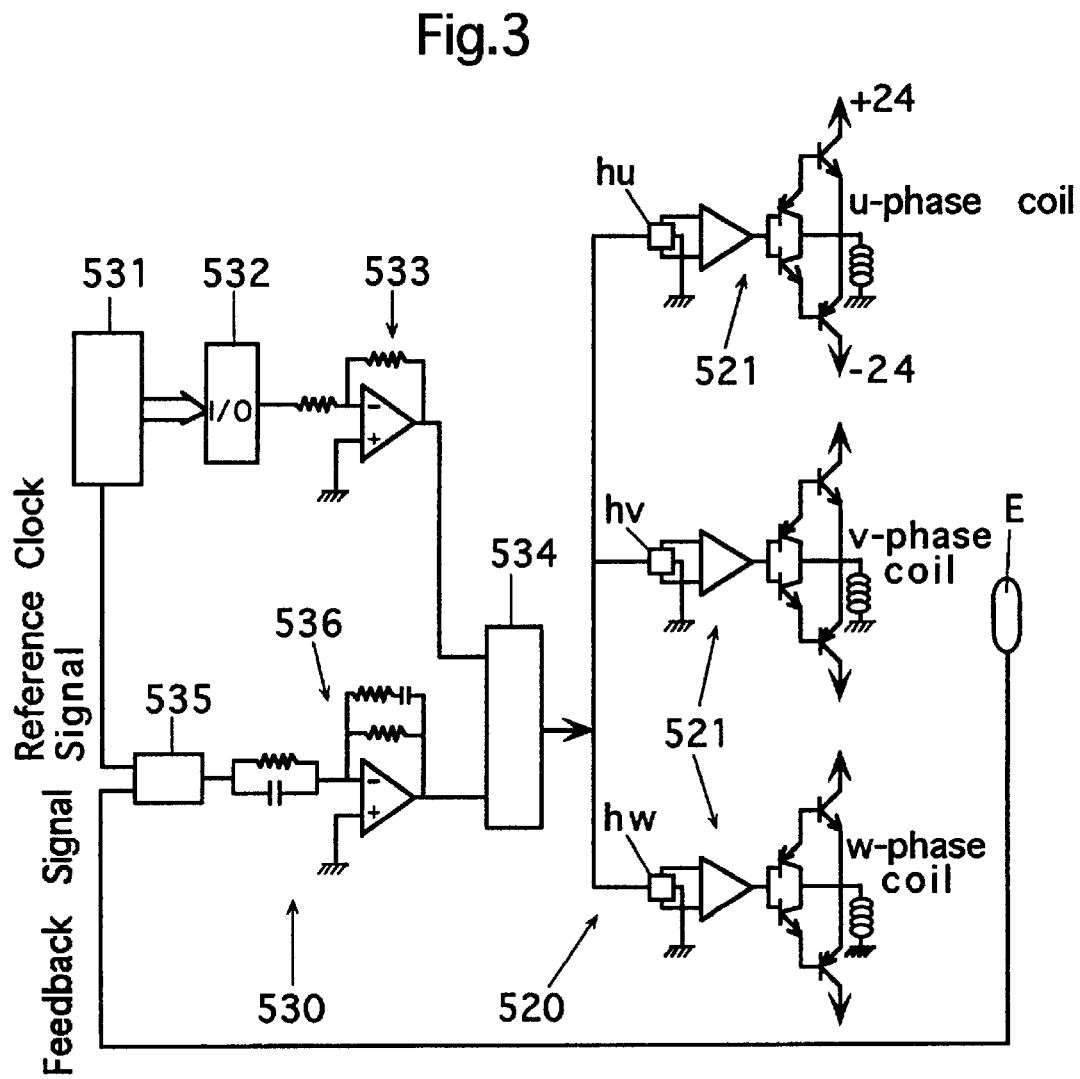

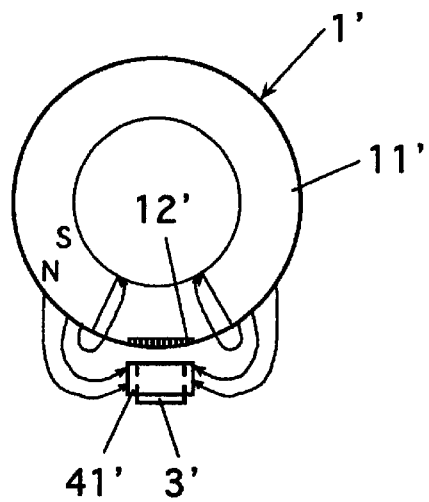

LINEAR DRIVE DEVICE

This application is based on applications Nos.8-357722 Pat. and 9-312978 Pat. filed in Japan, the contents of which are hereby incorporated by reference.

BACKGROUND OF THE INVENTION

1. Field of the Invention

The present invention relates to a linear drive device utilizing a linear motor, and particularly a linear drive device utilizing a linear motor which is provided with an encoder for operation control.

2. Description of the Related Art

In various fields relating to office automation equipment such as copying machines, image scanners and printers, to factory automation equipment such as X-Y tables and object transporting apparatuses, and optical equipment such as cameras, linear drive devices utilizing linear motors have been utilized for linearly moving objects or members.

A linear drive device of a so-called moving coil type is well known as a kind of drive device utilizing a linear motor. This type of linear drive device has a stator having a field magnet provided with N- and S-type magnetic poles arranged alternately to each other, and extending in a given direction, and a movable piece having an armature coil opposed to the field magnet, and being reciprocatively movable along the stator.

In the drive device of this type, coil components forming the armature coil are supplied with currents depending on the polarities of the magnetic poles of the field magnet opposed to the coil components, respectively, so that a drive force for driving the movable piece in an intended direction can be produced by an interaction between these currents and the magnetic field produced by the field magnet.

A sensor for sensing change in magnetic poles of the field magnet is mounted on a movable piece for controlling power supply to the armature coil so as to produce the movable piece drive force.

Such a sensor for the field magnet is generally formed of a magnetoelectric device such as a Hall element or a magnetoresistive element (e.g., MR element) which can issue an electric signal depending on the polarity of the magnetic pole and/or an intensity of the magnetic field.

The linear drive device utilizing the linear motor usually employs an encoder (usually, linear encoder) for sensing and controlling positions, speeds or the like of the movable piece, or an object, member or the like which is connected to and driven by the movable piece.

The linear encoder can be roughly classified into a magnetic encoder and an optical encoder.

The magnetic encoder is formed of a magnetic encoder scale in which N- and S-type magnetic poles are arranged alternately to each other in the movable piece moving direction with a pitch smaller than the pitch of the magnetic poles in the field magnet, and a magnetic sensor for reading magnetic information on the scale. The magnetic sensor usually employs a magnetoelectric element such as a magnetic resistance element (MR element) or a Hall element which issues an electric signal depending on the polarity of the magnetic pole of the magnetic encoder scale and/or the intensity of the magnetic field.

The optical encoder is formed of an optical encoder scale which is provided with two kinds of optically different surfaces arranged alternately to each other in the moving direction of the movable piece, and an optical sensor reading optical information on the scale. The photosensor may employ a photoelectric conversion element such as a photodiode or a phototransistor which can issue an electric signal depending on a quantity of light coming from the optical scale, or a one-packaged optical sensor, i.e., a combination of a light emitting diode (LED) emitting light beams to an encoder scale and a photoelectric conversion element.

If the magnetic encoder is to be employed in fields requiring driving of objects or the like under precise control of positions and/or speeds and, more specifically, in the field, e.g., of the office automation equipment, the detection of the scale information by the magnetic sensor must be able to suppress error, and the detected information must have a high precision.

However, in the structure employing the magnetic encoder with the magnetic encoder scale formed at the stator together with the field magnet, a magnetic force of the magnetic encoder scale is usually smaller than the magnetic force of the field magnet, and the magnetic encoder scale is susceptible to magnetic interference with the field magnet, and the sensor reading the magnetic information on the encoder scale is susceptible to the magnetism of the field magnet, so that the accuracy of sensing the magnetic information on the encoder scale by the sensor may be lowered, and an error in sensing may occur. If an error in sensing of the encoder scale information occurs, the linear drive device may not operate smoothly with a high accuracy, or a malfunction may occur.

In view of the above, the following has been proposed, e.g., for the linear drive device of such a type that a field magnet and a magnetic encoder scale are arranged on a stator, and a magnetic sensor reading magnetic information on the encoder scale is mounted on a movable piece which can move along the stator.

According to one of the proposals, the field magnet and the magnetic encoder scale are spaced from each other so that an offset variation in output waveform of the magnetic sensor for the encoder, caused by an influence by the field magnet, is kept within a predetermined range. It is also proposed that a magnetic shield wall is arranged between the field magnet and the magnetic encoder scale.

According to the former, however, the magnetic flux distribution of the field magnet must be narrow so as to keep the offset variation in output waveform of the encoder magnetic sensor within the predetermined range. This lowers the force for driving the movable piece, and may impede stable and smooth operation of the movable piece.

In the latter, although the magnetic shield wall is arranged between the field magnet and the magnetic encoder scale, the magnetic force produced from the field magnet partially passes over the magnetic shield wall toward the scale, resulting in disadvantages such as deterioration of the sensing accuracy of the magnetic sensor.

The following can also be pointed out in connection with the linear drive device utilizing the linear motor.

The sensor sensing the change in magnetic polarity of the field magnet on the stator as well as the sensor reading the encoder scale information may be deteriorated to lower the sensing accuracies when a thermal influence is exerted thereon. In the prior art, however, the movable piece is arranged and used without taking the heat generation of the armature coil into consideration.

For example, the Hall element, which is a kind of magnetoelectric element and can be employed as the field magnet sensor or the magnetic encoder sensor, may be typically selected from Hall elements containing InSb (indium antimony), InAs (indium arsenic) and GaAs (gallium arsenic). Outputs of these elements vary, to one degree or another, depending on a surrounding temperature. Particularly, the InSb-contained Hall element has bad temperature characteristics although it produces a large output signal (Hall voltage), and the output voltage thereof varies to a large extent depending on the temperature. The MR element, which is a kind of magnetoelectric element, has such characteristics that its output lowers with a rising of temperature.

The optical sensor which is employed in the optical encoder already described has likewise such disadvantage that it may deteriorate and the sensing accuracy may lower due to a thermal influence.

As described above, the sensors for the field magnet and encoder may deteriorate due to heat, and outputs thereof may vary, in which case information to be sensed cannot be sensed accurately, resulting in such disadvantages, for example, that the linear drive device may not operate accurately and smoothly, and may malfunction.

In spite of the above facts, the drive devices utilizing the linear motors in the prior art are provided with the sensors which are arranged without taking the influence by heat generation of the armature coil into consideration. Although one of the sensors for the field magnet and the encoder may be arranged at a position (e.g., under the stator) less affected by the thermal influence of the armature coil, the other sensor is arranged at a position (e.g., above the stator) which is susceptible to the thermal influence. In the structure where one of the sensors is arranged at a position susceptible to the influence by the heat of the armature coil, and thereby cannot achieve an intended information sensing accuracy, such disadvantages occur that the linear drive device cannot operate accurately and smoothly as a whole, and a malfunction occurs. These disadvantages are liable to occur among the drive devices utilizing the linear motor of the moving coil type with the armature coil of the movable piece fitted around the stator and, in other words, are liable to occur in the drive device utilizing the linear motor of a so-called shaft type.

The following can also be pointed out in connection with the linear drive device of the moving coil type, and particularly the linear drive device utilizing the linear motor of the shaft type.

When the movable piece driving a driven object is connected to the driven object and particularly one of its opposite ends which are spaced in a direction crossing the drive direction of the driven object, i.e., a predetermined direction in which the driven object is to be driven linearly, a so-called yawing is liable to occur, and more specifically the movable piece is liable to swing around an axis which is perpendicular to both the moving direction of the movable piece and the width direction of the driven object crossing the moving direction. If this yawing occurs, the positional relationship between the field magnet sensor (i.e., sensor for the field magnet) mounted on the movable piece and the field magnet may deviate or become instable, and/or the positional relationship between the encoder sensor (i.e., sensor for the encoder) and the encoder scale may deviate or become instable. This prevents accurate and stable operation of the linear drive device, and causes problems such as a malfunction.

SUMMARY OF THE INVENTION

Accordingly, it is an object of the invention to provide a linear drive device utilizing a linear motor and capable of smooth and stable operation.

It is also an object of the invention to provide a linear drive device utilizing a linear motor and capable of accurate operation.

It is still another object of the invention to provide a linear drive device utilizing a linear motor provided with an encoder, and particularly a drive device in which a sensor for the encoder can accurately read information on an encoder scale.

In order to achieve the above objects, the invention provides linear drive devices utilizing linear motors as described in the following items (1) and (2).

(1) Linear Drive Device of a First Type

From a certain point of view, a linear drive device of the first type is a linear motor of a shaft type comprising:

a shaft-like member having a magnetized portion for drive (field magnet);

a cylindrical armature coil fitted around the shaft-like member; and at least one magnetism sensing device (magnetic sensor) for sensing a magnetism, said magnetism sensing device producing an output for obtaining therefrom a signal for driving the motor or a signal for controlling an operation of the motor, wherein a magnetic shield device is provided at least for one of said magnetism sensing devices for intercepting or suppressing an operation by a magnetism other than the magnetism to be sensed by said magnetism sensing device.

Said shaft-like member may be provided with a magnetized portion for producing a position signal (i.e., a magnetized portion for position sensing, and thus a magnetic encoder scale) in addition to said field magnet. In this case, said magnetism sensing device provided with said magnetic shield device may be a position signal sensing device (position signal sensing magnetic sensor) for sensing the position signal from said position signal producing magnetized portion, or a field magnet magnetic pole sensing device (magnetic sensor for sensing a magnetic pole of said field magnet) for sensing the magnetic pole of said field magnet. These two kinds of sensing device may be employed.

In either the structure where the magnetic shield device is provided for the position signal sensing device, or the magnetic shield device is provided for the field magnet magnetic pole sensing device, the magnetic shield device is arranged near the sensing device.

The field magnet magnetic pole sensing device is provided for switching the power supply to the armature coil based on an output of said field magnet magnetic pole sensing device.

A linear drive device belonging to the linear drive device of the first type also may be as follows:

A linear drive device comprising:

a stator having a magnetized portion for drive and a magnetized portion for position sensing, and extending in a given direction;

a movable piece having an armature coil opposed to said magnetized portion for drive and being reciprocatively movable along said stator;

a magnetic sensor being moved together with said movable piece for reading magnetic information held by said magnetized portion for position sensing; and a magnetic shield member provided for said magnetic sensor for shielding a magnetic flux emitted from said magnetized portion for drive.

Said magnetized portion for drive is formed of N- and S-type magnetic poles formed on the stator and arranged alternately to each other at a predetermined pitch along a lengthwise direction (i.e., moving direction of said movable piece) of the stator, and functions as a field magnet.

Said magnetized portion for position sensing is formed of N- and S-type magnetic poles formed on the stator and arranged alternately to each other at a predetermined fine pitch along the lengthwise direction of the stator, and functions as a magnetic encoder scale.

According to this linear drive device, a drive force is produced by an interaction between the armature coil of the movable piece and the magnetized portion for drive of the stator when power is supplied to the armature coil of the movable piece, and the movable piece is driven along the lengthwise direction of the stator (said constant direction). In this operation, the magnetic sensor moves together with the movable piece, and the position and speed of the movable piece can be sensed and controlled based on magnetic information sensed by the magnetic sensor from the magnetized portion for position sensing. Since the magnetic sensor is shielded by the magnetic shield member from the magnetic flux produced by the magnetized portion for drive, a sensed signal issued from the magnetic sensor can be effectively protected from the interference of the magnetic flux produced from the magnetized portion for drive, and therefore can have a high accuracy.

According to this linear drive device, provision of the magnetic shield member allows an arrangement of the magnetized portions for drive and position sensing at positions close to each other, and/or allows magnetization of the magnetized portion for drive to produce a large magnetic force such that, if the shield member were eliminated, an offset variation in output waveform of the magnetic sensor reading magnetic information of the magnetized portion for position sensing would be larger than 38% of a peak-to-peak value of the output signal of the magnetic sensor considered as an allowable limit value. In spite of the above arrangement and/or the increased magnetic force of the magnetized portion for drive, the accuracy in sensing the magnetic information by the magnetic sensor is kept high. Further, the above close arrangements as well as the increased magnetic force of the magnetized portion for drive can increase a magnetic flux distribution region of the magnetized portion for drive, so that the drive force for the movable piece can be increased.

Thereby, the movable piece can move stably, smoothly and accurately.

The offset variation in output waveform of the magnetic sensor specifically means increase or decrease (shift) of the output signal of the magnetic sensor reading the magnetic information on the magnetized portion for position sensing, and this increase or decrease is caused as a result of an influence exerted on the magnetized portion for position sensing from the magnetism produced from the magnetized portion for drive.

(2) Linear Drive Device of a Second Type

A linear drive device comprising:

a stator having a field magnet provided with N- and S-type magnetic poles arranged alternately to each other, and extending in a given direction;

a movable piece having an armature coil fitted over the stator and opposed to the field magnet, and being reciprocatively movable along the stator;

a first sensor provided at the movable piece and opposed to the field magnet for sensing a variation in magnetic polarity of the field magnet;

an encoder scale arranged in a reciprocatively moving direction of the stator; and a second sensor provided at the movable piece and opposed to the encoder scale for reading information on the encoder scale, wherein the first and second sensors are arranged at a region around the stator excluding for a region above an upper surface of the stator.

According to this linear drive device, a drive force is produced by an interaction between a current flowing through the armature coil and a magnetic field formed by the field magnet when power is supplied to the armature coil, so that the movable piece is driven along the stator.

Control of the power supply to the armature coil is performed based on information relating to a polarity of the magnetic pole of the field magnet and/or an intensity of the magnetic field sensed by the first sensor as well as information sensed by said second sensor from the encoder scale.

According to this linear drive device, the first sensor for sensing the variation in polarity of the field magnet and the second sensor for reading the information on the encoder scale are both arranged at the region other than the region above the upper surface of the stator to which heat generated by the armature coil fitted over the stator is applied to the largest extent. Therefore, the first and second sensors are restrained from influence by the heat generated from the armature coil, and an intended information sensing accuracy is kept, so that the linear drive device can operate accurately and smoothly with a high reliability.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram schematically showing a structure of a drive portion of the linear drive device shown in FIG. 1;

FIG. 3 shows a major portion of an operation control circuit including a speed control circuit of a phase-locked control type in the linear drive device shown in FIG. 1;

FIG. 6(A) shows a shield effect by the magnetic shield of the linear drive device shown in FIG. 1, and FIG. 6(B) is a schematic plan of an image reading apparatus equipped with the linear drive device of the type shown in FIG. 1;

DESCRIPTION OF THE PREFERRED EMBODIMENTS

Figure 1:
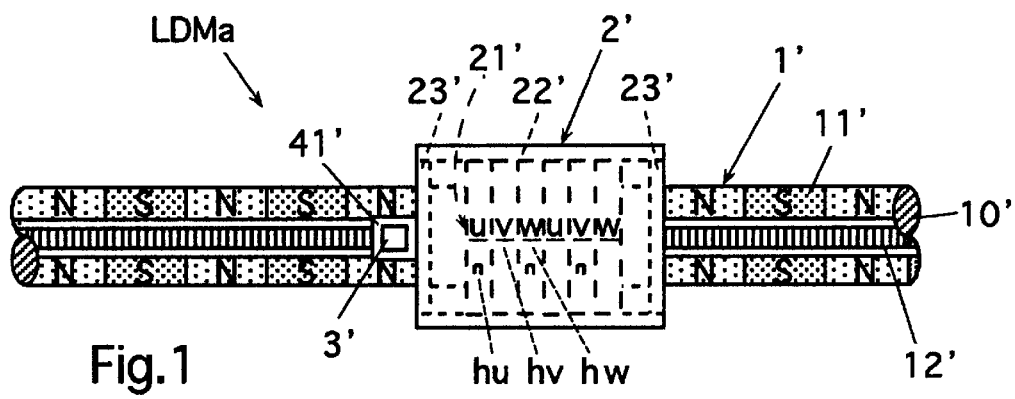
FIG. 1 is a schematic bottom view of a linear drive device of an embodiment of the invention.

Linear drive devices of the first and second types will be described below in more detail.

(1) Linear Drive Device of a First Type

As already described, a linear drive device of the first type may comprise a stator having a magnetized portion for driving and a magnetized portion for position sensing, and extending in a given direction; a movable piece having an armature coil opposed to said magnetized portion for drive and being reciprocatively movable along said stator; a magnetic sensor being moved together with said movable piece for reading magnetic information held by said magnetized portion for position sensing; and a magnetic shield member provided for said magnetic sensor for shielding a magnetic flux emitted from said magnetized portion for drive.

The stator is formed of a shaft member made of, e.g., metal containing Fe—Cr—Co or mangan aluminum which allows machining and magnetization. As a typical example, the stator may be formed of the shaft member having a circular section by magnetizing the same to form a magnetized portion (field magnet) for drive and a magnetized portion (magnetic encoder scale) for position sensing.

For suppressing interference of the magnetic flux produced by the magnetized portion for drive with the magnetized portion for position sensing, it is desired that the magnetized portions for drive and position sensing are spaced such that an offset variation in output signal of the magnetic sensor does not exceed 38% (more preferably, 30%) of the peak-to-peak value of the output signal which can be considered as the maximum allowable value.

The magnetic sensor may be an MR sensor utilizing a magnetic resistance element (magnetoresistive element) or a Hall sensor utilizing a Hall element.

The magnetic shield member is typically made of a ferromagnetic material such as iron or silicon steel.

The magnetic shield member may be arranged and formed as described in the following items (1)–(5).

(1) The magnetic shield members are arranged at only the front and rear, in the moving direction of the movable piece, of the magnetic sensor. This arrangement is effective when the magnetic sensor is formed of the MR sensor having a directional property in sensitivity to a magnetic force.

(2) The magnetic shield member is arranged around the magnetic sensor. For example, the magnetic shield member is arranged to surround the sensing surface of the magnetic sensor opposed to the magnetized portion for position sensing. This arrangement is effective for all types of the magnetic sensors.

(3) The edge of the magnetic shield member opposed to the stator has such a section in a direction crossing the moving direction of the movable piece that follows a contour of the section of the portion of the stator opposed thereto.

For example, at least one of the magnetic shield members has an edge which is opposed to the stator and extends across the moving direction of the movable piece. The edge of this magnetic shield member has a form following the contour of the section of the portion of the stator opposed thereto.

This arrangement of the magnetic shield member suppresses the magnetic flux issued from the magnetized portion for drive from passing around the magnetic shield member toward the magnetic sensor.

(4) At least in the moving direction of the movable piece, the magnetic shield members are arranged at the front and rear of the magnetic sensor, and each of the magnetic shield members at the front and rear of the magnetic sensor has such a form that the thickness decreases as the position moves away from the magnetic sensor and, in other words, an area of its section parallel to the moving direction of the movable piece decreases with increase in distance from the magnetized portion for position sensing. Thereby, cogging is suppressed, and the driving accuracy of the linear drive device is improved.

(5) At least in the moving direction of the movable piece, the magnetic shield members are arranged at the front and rear of the magnetic sensor, and each of the magnetic shield members at the front and rear of the magnetic sensor has such a form that an end thereof remote from the magnetic sensor in the moving direction of the movable piece is inclined with respect to the moving direction. In other words, each of the magnetic shield members at the rear and front of the magnetic sensor has such a form that an end thereof remote from the magnetic sensor in the moving direction of the movable piece extends obliquely with respect to the magnetized portion for position sensing.

This arrangement of the magnetic shield members suppresses cogging, so that a drive accuracy of the motor is improved.

The stator may have a form described in the following item (6) or (7).

(6) The stator is provided with at least one plane extending in the lengthwise direction of the stator. For example, the shaft-like stator having a circular section has a portion which is cut to form the plane extending in the lengthwise direction thereof. Alternatively, the shaft-like stator may have a polygonal section. The portion forming the above plane may be magnetized to form the magnetized portion for position sensing, whereby a gap between the magnetic shield member and the magnetized portion for position sensing can be reduced, so that the flux issued from the magnetized portion for drive is restrained from passing around the magnetic shield member toward the magnetic sensor, and therefore the sensed signal of the magnetic sensor can have a high accuracy.

(7) The stator is provided with two grooves in the lengthwise direction thereof. In this structure, the magnetized portion for position sensing is formed between these two grooves, and the magnetized portion for drive is formed at a portion other than the magnetized portion for position sensing. Also, the magnetic shield member is formed of a member which is movable along the groove and, for this purpose, has a portion fitted into the groove. In other words, the magnetic shield member is provided with a projection(s) which is fitted into the groove for movement along the groove.

The above structure can suppress the flux issued from the magnetized portion for drive from passing around the magnetic shield member toward the magnetized portion for position sensing, so that the sensed signal of the magnetic sensor can have an improved accuracy.

The linear drive device may employ, in combination, two or more of the arrangements, forms and others of the magnetic shield members and the stator described in the foregoing items (1) to (7).

It is desired that the magnetic sensor for reading the magnetic information on the magnetized portion for position sensing is arranged on or near the central axis of the yawing operation of the movable piece. As an example of the position near the central axis of the yawing, the magnetic sensor may be arranged on or near a plane which contains the central axis and is perpendicular to the moving direction of the movable piece.

Figure 27:
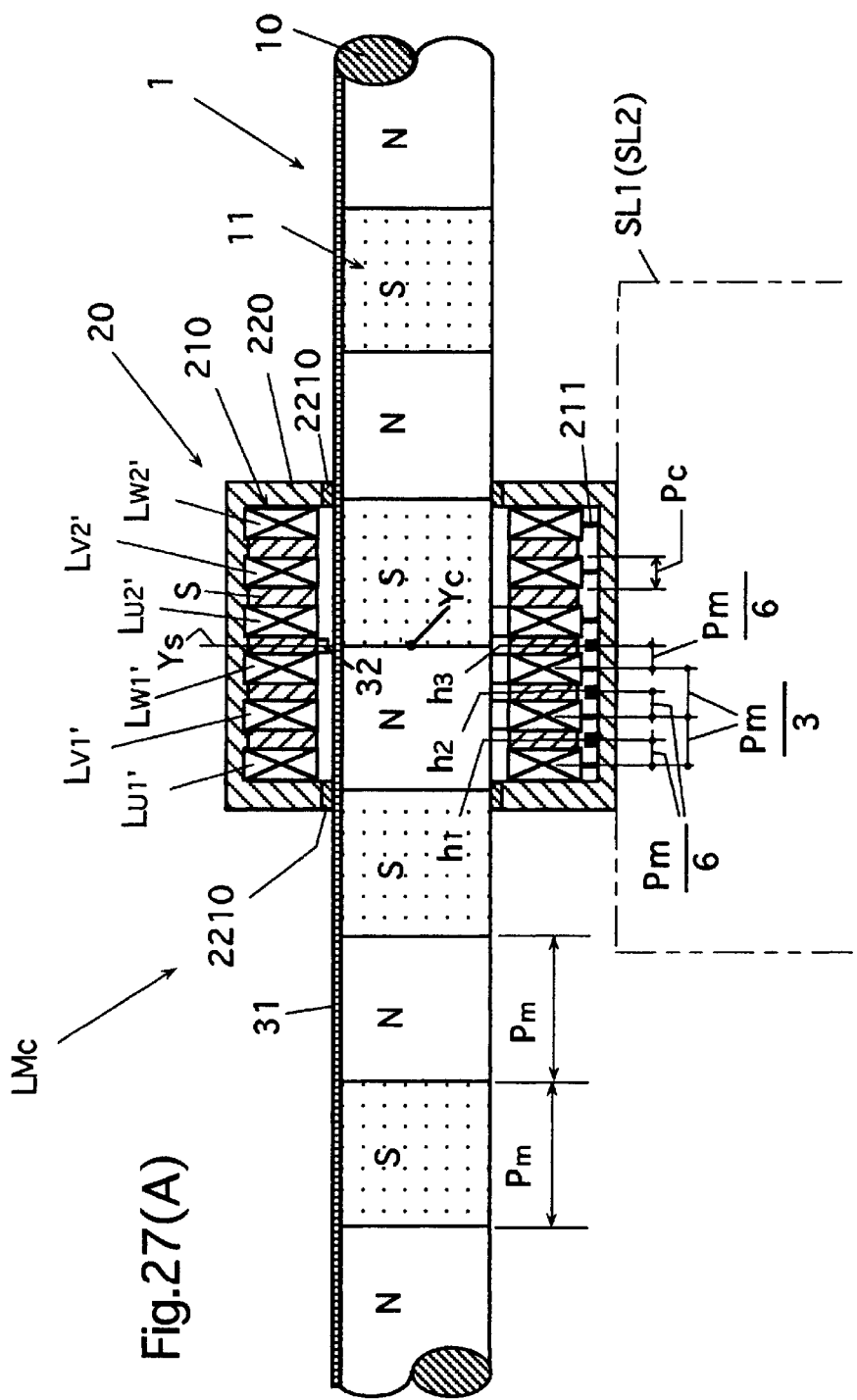
FIG. 27(A) is a schematic plan showing a linear drive device of another embodiment of the invention with a movable piece portion cut away.
FIG. 27(B) shows a yawing operation of the movable piece.

The yawing of the movable piece is a swing operation Ym of the stator shown in FIG. 27(B), which occurs around an axis (central axis of the yawing) Yc perpendicular to both of a moving direction GO of a driven object and a widthwise direction WD of the driven object crossing the moving direction GO in such a case that the driven object is, for example, a slider arranged in an image reading apparatus and carrying an optical part for reading an original image, and the movable piece is connected to one side of the driven object to be driven linearly by the movable piece. The yawing is liable to occur due to an inertial force and a moving resistance of the driven object.

Owing to arrangement of the magnetic sensor on or near the central axis of the yawing, it is possible to suppress deviation and instability in positional relationship (e.g., distance) between the magnetic sensor and the magnetized portion for position sensing even when the movable piece yaws, so that the linear drive device can be driven accurately and smoothly under intended control.

The linear drive device of the first type will now be described below in more detail.

FIG. 1 is a schematic bottom view of a linear drive device of an embodiment of the invention.

A linear drive device LDMa is of a shaft type, and includes a shaft-like stator 1' having a circular section and a movable piece 2' fitted around the stator 1'.

The stator 1' is formed of a straight shaft member 10' which is made of a material allowing machining and magnetization, and has a circular section and a smoothened surface. The shaft member 10' is provided with a magnetized portion (field magnet) 11' for drive which is formed by magnetizing the shaft member 10' to form N- and S-poles arranged alternately to each other in a lengthwise direction thereof at a pitch, e.g., of 30 mm. The shaft member 10' is also provided with a magnetized portion (i.e., magnetic encoder chart or scale) 12' for position sensing which is formed by magnetizing the shaft member 10' to form N- and S-poles arranged alternately to each other in the lengthwise direction at a pitch, e.g., of 200 μm.

The magnetized portions 11' and 12' for drive and position sensing are arranged at the peripheral surface of the shaft member 10' with a distance from each other as will be described later.

The movable piece 2' has an armature coil 21' formed of a plurality of ring-shaped coils u, v and w which are fitted around the stator 1' with spaces therebetween. The armature coil 21' is supported at the inner side of a cylindrical movable piece yoke 22' having a circular section and made of a magnetic material. The movable piece yoke 22' is provided at its opposite ends with bearings 23', through which the movable piece 2' is guided for smooth movement along the stator 1'. The coils u, v and w of the armature coil 21' are arranged at positions shifted by an electrical angle of $2\pi/3$ from each other (or positions of the same phases as the positions shifted by $2\pi/3$ from each other). A Hall element hu, which is a kind of a magnetoelectric element and serves as a sensor for drive, is arranged at the u-phase coil, and is opposed to the magnetized portion 11' for drive. Likewise, Hall elements hv and hw are arranged at the v- and w-phase coils, respectively, and are opposed to the magnetized portion 11' for drive.

The movable piece 2' is provided with a magnetic sensor 3' opposed to the position sensing magnetized portion 12' of the stator 1' for sensing magnetic information on the magnetized portion 12'. The magnetic sensor 3' in this embodiment is an MR sensor utilizing a magnetic resistance element (magnetoresistive element). It may be a Hall sensor utilizing a Hall element. If a distance between the magnetic sensor 3' and the position sensing magnetized portion 12' were excessively large, it would be necessary to increase significantly a gain of an output signal of the magnetic sensor 3'. Therefore, the distance is desirably of the order of micrometers in view of the sensing accuracy, and is 50 μm in this embodiment.

The magnetic sensor 3' is surrounded by a magnetic shield member 41' for shielding a magnetic flux from the drive magnetized portion 11'. This magnetic shield member 41' covers four surfaces of the magnetic sensor 3' perpendicular to the sensing plane thereof. The magnetic shield member 41' is formed of a ferromagnetic material such as iron or silicon steel. The shield member 41' has a thickness of only about 1 mm or more for achieving the above shielding effect.

A distance between the drive magnetized portion 11' and the position sensing magnetized portion 12' is determined such that an offset variation in output waveform of the magnetic sensor 3' provided with the magnetic shield member 41' is 38% (about 38% in this embodiment) or less of a peak-to-peak value of a sensor output signal, which can be considered as an allowable limit value.

According to the linear drive device LDMa described above, the movable piece 2' is driven in the lengthwise direction of the stator 1' by an interaction between the current flowing through the armature coil 21', which is energized, and the magnetic field of the drive magnetized portion 11'. In this operation, the magnetic sensor 3' which is driven together with the movable piece 2' reads the magnetic information on the position sensing magnetized portion 12', and the movable piece 2' is driven under control based on the magnetic information thus read. The sensed signal of the magnetic sensor 3' can be utilized for detection and control of the position, speed and other purposes.

The operation control of the linear drive device LDMa will now be briefly described below.

As already described, the drive magnetized portion 11' of the stator 1' is magnetized to have a distribution of the magnetic flux density having one cycle defined by N- and S-poles. Also, the armature coil 21' of the movable piece 2' is formed of three-phase coils u, v and w arranged at positions shifted by an electrical angle of $2\pi/3$ from each other (or positions of the same phases as the positions shifted by $2\pi/3$ from each other), as already described. The movable piece 2' is provided with the Hall elements hu, hv and hw. Each Hall element senses the intensity and direction of the magnetic flux of the drive magnetized portion 11' at the position thereof. The linear drive device is driven by supplying to the coils the currents of the magnitude and direction which correspond to the magnitudes and directions of the magnetic flux sensed by the Hall elements. Thus, a so-called three-phase drive system is employed, and signals shifted in phase by 120 degrees from each other are supplied to the coils for producing a constant drive force independent of the position of the movable piece 2'. In the embodiment, the three-phase drive system is employed, and also the phase lock control system generally called "PLL" is employed for driving the movable piece 2' at an intended speed.

FIG. 2 is a schematic block diagram showing a drive portion 500 for driving the linear drive device, and also showing the linear drive device LDMa and an encoder E. The encoder E is formed of the magnetic sensor 3', the position sensing magnetized portion 12' and circuits (not shown) which amplify and wave-shape the output signals of the magnetic sensor 3'.

In FIG. 2, 510 indicates a DC current source, 520 indicates a power supply control circuit portion including the foregoing Hall elements, E indicates the encoder for position sensing, speed sensing and other purposes, and 530 indicates a speed controller of the phase lock control type.

FIG. 3 shows a major portion of the operation control circuit including the speed control circuit of the phase lock control type. In FIG. 3, 531 indicates a computer which instructs predetermined operations of the linear drive devices and issues a reference clock signal to a phase lock controller 535, 532 indicates an input/output port of the computer 531, 533 indicates an amplifier, 534 indicates a switching unit, 535 indicates the phase lock controller, 536 indicate a compensation circuit and 521 indicates an amplifier circuit.

In the drive portion 500 shown in FIGS. 2 and 3, the computer 531 issues the reference clock signal corresponding to the intended speed to the phase lock controller 535, and the encoder E feeds back the signal representing the moving speed of the movable piece 2' to the controller 535. The phase lock controller 535 issue a signal corresponding to differences in frequency and phase between the pulse of the reference clock and the pulse of the feedback signal sent from the encoder E, and the compensating circuit 536 compensates a lead or retard on the transmission system to issue an output signal, which is used as a reference input voltage by the Hall elements. As already described, each Hall element issues a voltage corresponding to the magnitude and direction of the magnetic flux at the position thereof, and this output voltage is proportional to the reference input voltage. Accordingly, the Hall element issues the output voltage which corresponds to the difference between the reference clock signal and the feedback signal. The output voltage of the Hall element is proportionally amplified by the amplifier circuit 521, and is supplied to the armature coil. In this manner, the pulse of the reference clock and the pulse of the feedback signal are adjusted to have the coincident frequencies and phases, and thus the linear drive device LDMa is driven to attain the intended speed of the movable piece 2'.

Figure 4:
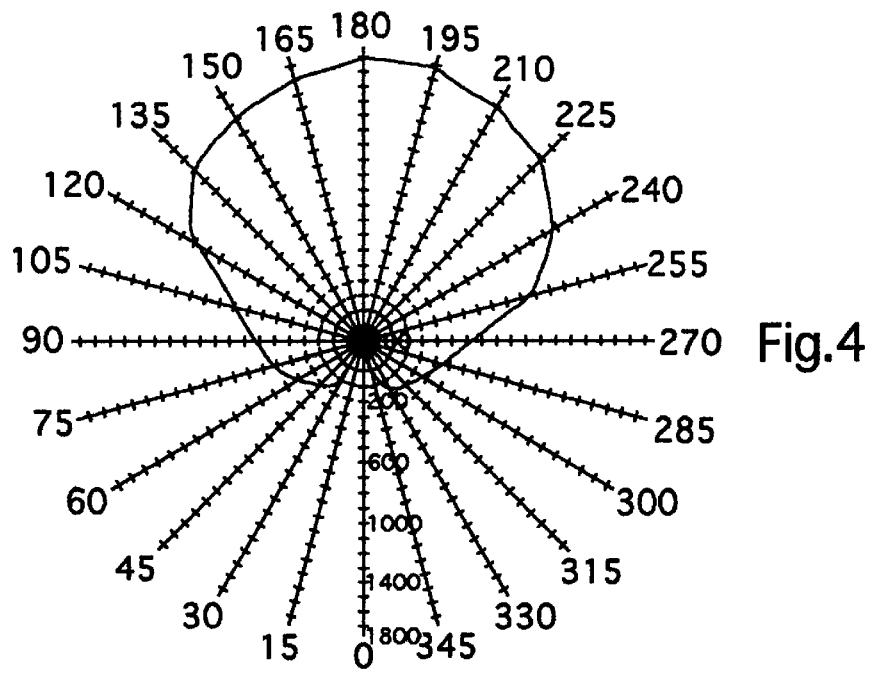
FIG. 4 shows, by way of example, a magnetic flux distribution in a circumferential region of a magnetized portion for drive of the stator in the linear drive device shown in FIG. 1.

FIG. 4 shows an example of the magnetic flux in the circumferential direction of the stator 1', which is exhibited with the magnetized portions 11' and 12' for drive and position sensing spaced such that an offset variation in output waveform of the magnetic sensor 3' provided with the magnetic shield member 41' is 38% or less of the peak-to-peak voltage of the sensor output voltage. The position sensing magnetized portion 12' is formed at the position of 0° in the figure.

According to the above linear drive device, since the magnetic sensor 3' is surrounded by the magnetic shield member 41', the magnetization can be formed to produce a large magnetic force as a whole for producing a large drive force, as shown in FIG. 4, in spite of the fact that the magnetization is formed such that the offset variation of the magnetic sensor 3' is 38% or less of the peak-to-peak value of the sensor output. The linear drive device can produce a drive force which is larger by 1.5 times than that of a conventional device provided that both basically have the same structures.

Figure 5:
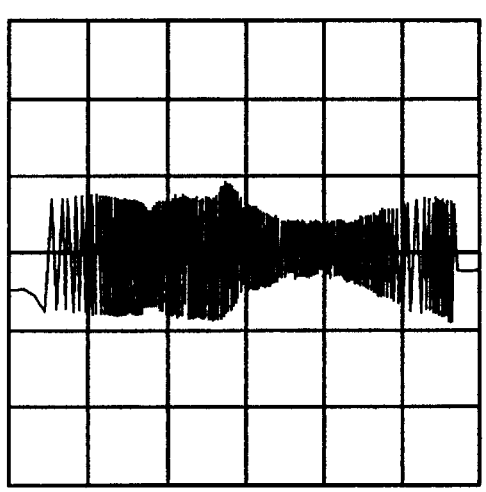
FIG. 5(A) shows, by way of example, an output signal of a magnetic sensor reading magnetic information of a magnetized portion for position sensing in the linear drive device shown in FIG. 1.
FIG. 5(B) shows, by way of example, an output signal of the magnetic sensor without a shield by a magnetic shield member.
Figure 5:
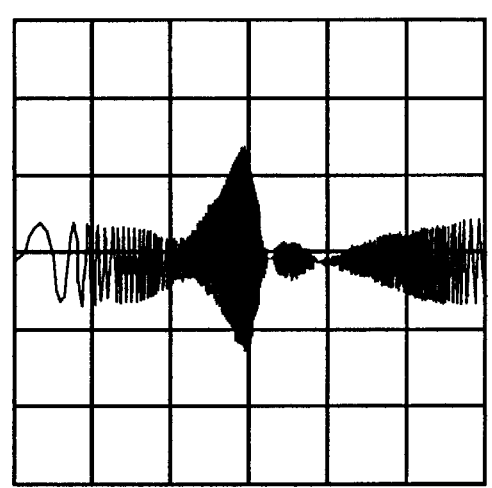

As described above, the magnetic flux of the drive magnetized portion 11' can be increased while suppressing the offset variation in sensed signal of the magnetic sensor 3' within a range not exceeding 38% of the allowable limit value. FIG. 5(A) shows an example of the output waveform of the magnetic sensor 3' with the magnetic flux distribution shown in FIG. 4. Since the magnetized portions 11' and 12' for drive and position sensing are spaced from each other, the magnetic force produced by the drive magnetized portion 11' is restrained from magnetically interfering with the position sensing magnetized portion 12'. Also, provision of the magnetic shield member 41' restrains the magnetic force of the drive magnetized portion 11' from passing to the sensor 3', as shown in FIG. 6(A). owing to them, the output waveform shown in FIG. 5(A) is obtained, and thereby the position sensing and others can be performed accurately.

For reference, FIG. 5(B) shows an output signal of a magnetic sensor (an MR sensor) with the magnetic flux distribution shown in FIG. 4 in a case that a magnetic shield member is not employed. If the magnetic shield member is not employed, the offset variation in output signal increases (about 100% in a certain region), and a signal is not issued locally in another region, as shown in FIG. 5(B). Accurate position sensing and others are impossible with this output signal of the magnetic sensor. From this, it can be understood that the magnetic shield member 41' sufficiently suppresses the interference due to the drive magnetized portion 11'.

The linear drive device LDMa described above has a relatively small number of parts, which enables a low manufacturing cost and easy manufacturing. The easy manufacturing also reduces the cost.

The linear drive device LDMa described above can be employed for driving various kinds of driven objects. FIG. 6(B) is a schematic plan of an image reading apparatus equipped with the linear drive device described above.

The image reading apparatus in FIG. 6(B) is substantially the same as an image reading apparatus, which will be described later with reference to FIGS. 13 and 15 in connection with a linear drive device of the second type, except for the linear drive device. Description in detail will be given later, and parts will now be described only briefly.

In FIG. 6(B), SL1 and SL2 indicate sliders to be linearly driven for scanning an original document image. The slider SL1 carries an illumination lamp LP and a reflection mirror m1. The slider SL2 carries reflection mirrors m2 and m3 (not shown in FIG. 6(B)). In the figure, an image reading unit 8 is arranged at a side remote from the sliders. The unit 8 includes a lens 81 and a CCD 82, i.e., an imaging element.

The slider SL1 is linearly driven by the linear drive device LDMa, and the slider SL2 is linearly driven by a linear drive device LDMa' having a structure similar to that of the drive device LDMa. In an image reading operation, the slider SL1 is driven toward the unit 8 in the figure at double the speed of the slider SL2. In the figure, G indicates a guide rail, and r indicates a roller arranged at an end of the slider for rolling along the rail G.

The linear drive devices LDMa and LDMa' have the substantially same structures as those already described, and include movable pieces 2' and 2α' for movement along the stator 1'. The movable piece 2' has the armature coil 21' arranged in the movable piece yoke 22' and fitted around the stator 1', and also includes the magnetic sensor 3' which is opposed to the position sensing magnetized portion 12' on the stator 1' and is surrounded by the magnetic shield member. The movable piece 2α' has an armature coil 21α' arranged in a movable piece yoke 22α' and fitted around the stator 1', and also includes a magnetic sensor 3α' which is the same as the sensor 3', is opposed to the position sensing magnetized portion 12' on the stator 1' and is surrounded by a magnetic shield member. As already described, the stator 1' is provided with the magnetized portions 11' and 12' for drive and position sensing, and extends in a direction of secondary scanning of the original image.

In this apparatus, the magnetic sensor 3' is arranged on a central axis of a yawing operation of the movable piece 2', and is opposed to the position sensing magnetized portion 12'. The magnetic sensor 3α' is arranged on a central axis of a yawing operation of the movable piece 2α', and is opposed to the position sensing magnetized portion 12'.

When the sliders SL1 and SL2 on the movable pieces 2' and 2α' in the linear drive devices LDMa and LDMa' respectively, are linearly driven, the above structure can suppress shifting and instability of the positional relationships (distances and others) of the magnetic sensors 3' and 3α' with respect to the position sensing magnetized portion 12' even if the yawing occurs. Therefore, the linear drive devices LDMa and LDMa' can be driven accurately and smoothly under the control.

The form and arrangement of the magnetic shield member (s) is not restricted to those shown in FIG. 1, in which the magnetic shield member surrounds the magnetic sensor 3'. Other examples of the forms and arrangements of the magnetic shield members will be successively described below with reference to FIGS. 7 to 10. Linear drive devices shown in FIGS. 7 to 10 are similar to that shown in FIG. 1, and each have the stator 1' and the movable piece 2' as well as magnetized portions 11' and 12' for drive and position sensing formed on the stator 1' spaced from each other. The movable pieces are not shown, and the magnetic sensors 3' are mounted on the movable pieces for movement together with the same.

Figure 7:
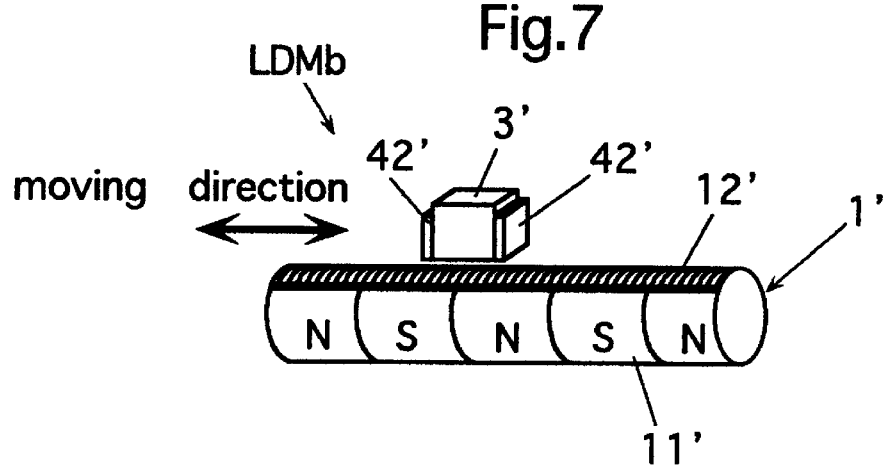
FIG. 7 is a schematic perspective view of a portion of a linear drive device of another embodiment of the invention.

In a linear motor LDMb shown in FIG. 7, magnetic shield members 42' are arranged on at the front and rear, in the movable piece moving direction (i.e., lengthwise direction of the stator 1'), of the magnetic sensor 3' and more specifically are arranged on the front and rear surfaces thereof. This structure is effective when an MR sensor is employed as the magnetic sensor 3' because of the following reason. The MR sensor has a directional property in sensitivity to a magnetic force, and is arranged such that the direction attaining a high sensitivity is coincident with the moving direction of the movable piece. Therefore, by arranging the magnetic shield members 42' on the front and rear surfaces of the magnetic sensor in the moving direction as shown in the figure, it is possible to suppress interference by the magnetic flux which is issued from the drive magnetized portion 11'. Thereby, the output signal of the magnetic sensor 3' can have a high accuracy.

Figure 8:
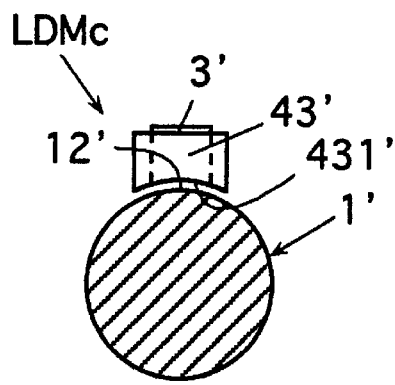
FIG. 8 is a schematic cross section of a portion of a linear drive device of another embodiment of the invention.

In a linear motor LDMc shown in FIG. 8, magnetic shield members 43' surround the four surfaces of the magnetic sensor 3', and each of the shield members 43' located at the front and rear, in the movable piece moving direction, of the sensor 3' has an edge 431', which is opposed to the stator 1' and has a form or shape following the contour of the section of the portion of the stator 1' opposed to the shield member 43'. According to this structure, each of the front and rear magnetic shield members 43' has a complicated configuration, but can minimize a gap between the magnetic shield member 43' and the stator 1', so that passing of the magnetic flux from the drive magnetized portion 11' to the magnetic sensor 3' is suppressed, and thereby the output signal of the magnetic sensor 3' can have a high accuracy.

Figure 9:
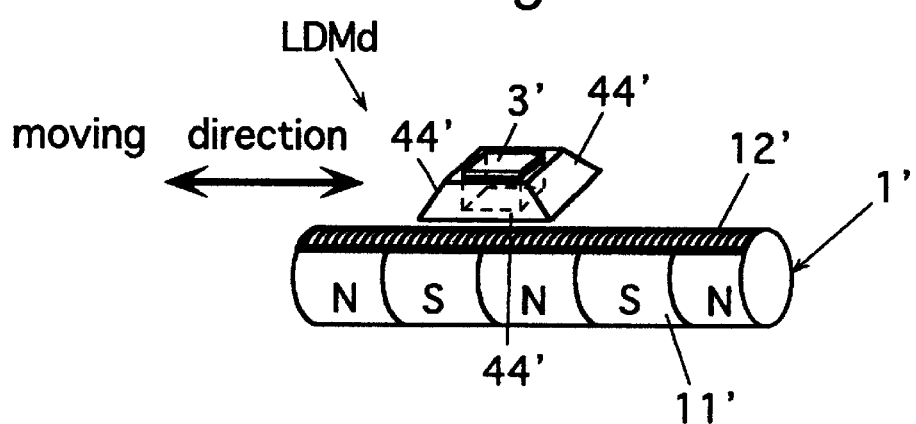
FIG. 9 is a schematic perspective view of a portion of a linear drive device of another embodiment of the invention.

In a linear motor LDMd shown in FIG. 9, magnetic shield members 44' surround the four surfaces of the magnetic sensor 3', and each of the shield members 44' at the front and rear, in the movable piece moving direction, of the magnetic sensor 3' has a thickness which decreases as the position moves away from the sensor 3'. This structure is employed in view of cogging (jerky movement) which may occur in the linear motor due to variation in magnetic attractive force acting on the ends in the moving direction, and may deteriorate the drive accuracy of the motor. Since each of the front and rear magnetic shield members 44' in this embodiment has a reduced thickness at the end in the moving direction, magnetic saturation is more likely to occur at the end, whereby the cogging can be suppressed, and the drive accuracy of the motor can be improved.

Figure 10:
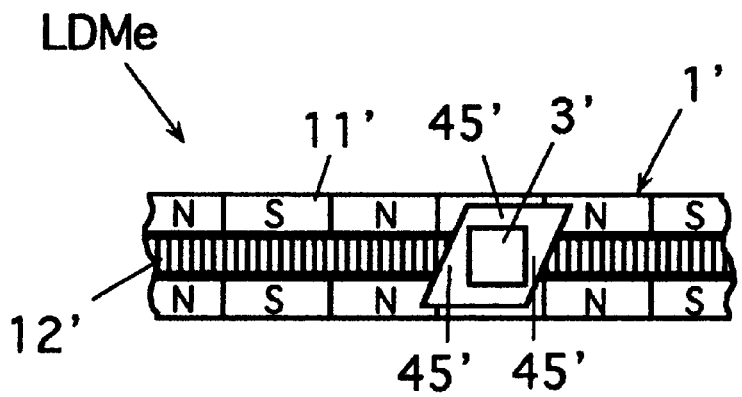
FIG. 10 is a schematic plan of a portion of a linear drive device of another embodiment of the invention.

In a linear motor LDMe shown in FIG. 10, magnetic shield members 45' surround the four surfaces of the magnetic sensor 3', and each of the magnetic shield members 45' at the front and rear, in the movable piece moving direction, of the magnetic sensor 3' has an edge which extends across the movable piece moving direction, and is inclined with respect to the moving direction. This structure is employed for reducing the cogging. By provision of the edge inclined with respect to the moving direction, variation or shift occurs between frequencies of the magnetic forces acting on each portion of each end, in the moving direction, of the magnetic shield members 45', so that variation in magnetic attractive force at the ends can be reduced as a whole, whereby the cogging is suppressed, and thereby the drive accuracy of the motor can be improved. By combining this structure with the structure shown in FIG. 9 employing the magnetic shield member which has the end, in the moving direction, of the reduced thickness, the cogging can be further reduced.

Figure 11:
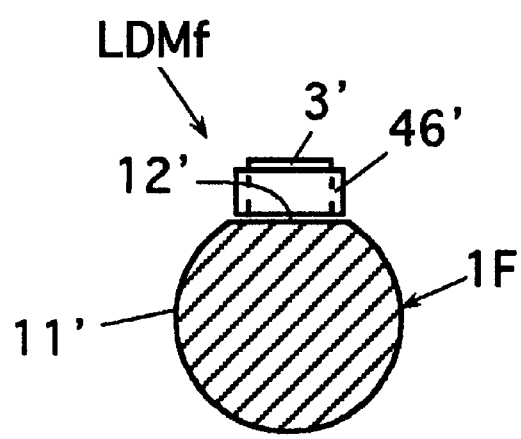
FIG. 11 is a schematic cross section of a portion of a linear drive device of another embodiment of the invention.
Figure 12:
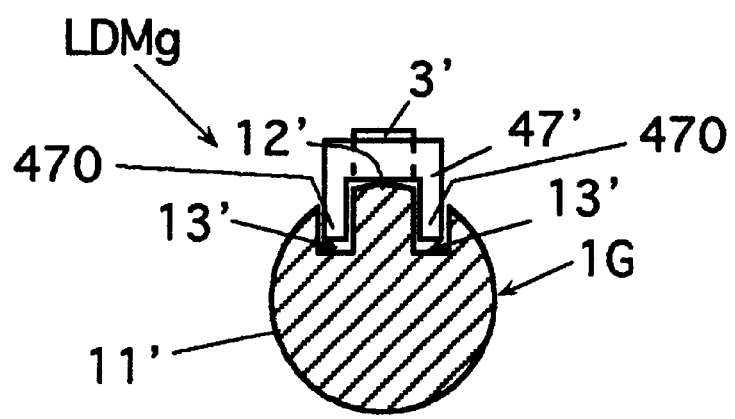
FIG. 12 is a schematic cross section of a portion of a linear drive device of another embodiment of the invention.

FIGS. 11 and 12 show examples in which the magnetic shield members are combined with stators having sections other than the circular section already described for improving the magnetic shield effect. In each of the linear drive devices shown in FIGS. 11 and 12, the magnetic sensor 3' is mounted on the movable piece (not shown in FIGS. 11 and 12) for movement together with the movable piece. The stator is provided with the magnetized portions 11' and 12' for drive and position sensing with a space therebetween.

In a linear drive device LDMf shown in FIG. 11, a stator 1F extending in the movable piece moving direction is formed by partially cutting off a shaft member having a circular section to provide a plane extending in the lengthwise direction of the stator (i.e., movable piece moving direction). The magnetized portion 12' for position sensing is formed at the plane or flat portion thus cut by magnetizing the plane portion. The magnetic sensor 3' is opposed to the magnetized portion 12' for position sensing, and thus is opposed to the cut plane portion. A magnetic shield member 46' surrounds the four surfaces of the magnetic sensor 3'. This structure can reduce a gap between the magnetic shield member 46' and the stator 1F, so that the magnetic flux generated from the drive magnetized portion 11' is restrained from passing to the magnetic sensor 3', and therefore the output signal of the magnetic sensor 3' can have a high accuracy. The stator may have a polygonal section, in which case a similar effect can be achieved.

In a linear motor LDMg shown in FIG. 12, a stator 1G extending in the movable piece moving direction is formed of a shaft member, which has a circular section and is provided with two grooves 13' extending in the lengthwise direction of the shaft member. The magnetized portion 12' for position sensing is formed between these grooves 13' by magnetizing the portion between them. The drive magnetized portion 11' is spaced from the position sensing magnetized portion 12' in the widthwise direction of the groove 13'. The magnetic sensor 3' is opposed to the position sensing magnetized portion 12'. A magnetic shield member 47' surrounds the four surfaces of the magnetic sensor 3', and has two portions 470 which are movably fitted into the grooves 13'. Owing to provision of the portions 470 of the magnetic shield member 47' extended into the grooves 13', the magnetic flux generated from the drive magnetized portion 11' is further restrained from passing to the position sensing magnetized portion 12', so that the output signal of the magnetic sensor 3' can have a further improved accuracy.

In the linear drive devices described above, the magnetic shields are provided for the magnetic sensor (MR element) for sensing information on the position sensing magnetized portion. Magnetic shields may be provided for the magnetic sensor (Hall element) for sensing the magnetic polarities of the drive magnetized portion in a similar manner.

(2) Linear Drive Device of a Second Type

As already described, the linear drive device of the second type may comprise: a stator having a field magnet provided with N- and S-type magnetic poles arranged alternately to each other, and extending in a given direction; a movable piece having an armature coil fitted over the stator and opposed to the field magnet, and being reciprocatively movable along the stator; a first sensor provided at the movable piece and opposed to the field magnet for sensing a variation in magnetic polarity of the field magnet; an encoder scale arranged in a reciprocatively moving direction of the stator; and a second sensor provided at the movable piece and opposed to the encoder scale for reading information on the encoder scale, wherein the first and second sensors are arranged at a region around the stator excluding a region above an upper surface of the stator.

The first and second sensors may be arranged outside the armature coil for further avoiding the thermal influence by the armature coil.

The first sensor may be a magnetoelectric element such as a Hall element or a magnetic resistance element. An electric signal issued by the magnetoelectric element for the field magnet can be utilized for power control of the armature coil. A Hall IC may be employed that includes a combination of the magnetoelectric element for the field magnet and a field magnet signal processing circuit capable of digitalization.

The encoder scale may be a magnetic encoder scale or an optical encoder scale. When the magnetic encoder scale is used, the second sensor may be a magnetic sensor reading magnetic information on the encoder scale. When employing the optical encoder scale, the second sensor may be an optical sensor reading optical information on the encoder scale.

The magnetic sensor for the magnetic encoder is, for example, a magnetoelectric element such as a magnetic resistance element (e.g., MR element) or a Hall element.

The optical sensor for the optical encoder may be a photoelectric conversion element such as a photodiode or a phototransistor which can issue an electric signal corresponding to a quantity of light coming from the optical encoder scale, or may be a photosensor in a one-package form including a combination of a light emitting element such as a light emitting diode (LED) emitting light beams to the encoder scale and a photoelectric conversion element.

The structure of the linear drive device described above, i.e., arrangement of the magnetic sensor (i.e., the second sensor) at a position which can suppress the influence by heat of the armature coil, is particularly preferable because the magnetic sensor is susceptible to the heat generated by the armature coil.

When the magnetic encoder is employed, and the magnetic encoder scale is arranged at the stator, it is preferable to arrange the first sensor for sensing the variation in magnetic pole of the field magnet as far as possible from the magnetic sensor employed as the second sensor. This enables arrangement of the field magnet and the magnetic encoder scale at positions which can minimize magnetic interference of the field magnet with the magnetic encoder scale and the magnetic sensor.

When the magnetic encoder is employed, and the magnetic encoder scale is arranged at the stator, the first sensor, the second sensor (magnetic sensor) and the magnetic encoder scale can be arranged, for example, as follows.

(1) The first sensor opposed to the field magnet is located beside one side surface of the stator, and the encoder scale is arranged at the other side surface of the stator. The second sensor opposed to the encoder scale is located beside the other side surface of the stator.

(2) The first sensor opposed to the field magnet is located under the lower surface of the stator, and the encoder scale is arranged at the side surface of the stator. The second sensor opposed to the encoder scale is located beside the side surface of the stator.

(3) The encoder scale is arranged at the lower surface of the stator, and the first sensor opposed to the field magnet is located beside the side surface of the stator. The second sensor opposed to the encoder scale is located under the lower surface of the stator.

The field magnet and the magnetic encoder scale may be added to the stator in a manufacturing step after completing the stator itself, or may be formed by magnetizing the stator itself made of a magnetizable material. In the latter case, the field magnet is formed of the magnetized portion for drive, which is produced by magnetizing the magnetizable stator itself to arrange the N- and S-type magnetic poles alternately to each other. The magnetic encoder scale may be formed of the magnetized portion for position sensing, which is prepared by magnetizing the magnetizable stator itself to form the N- and S-type magnetic poles at a pitch smaller than the magnetic pole pitch of the field magnet.

It is preferable to increase the output of the first sensor to achieve accurate control of power supplied to the armature coil. In view of this, the following linear drive device is desirably employed if the magnetic encoder is employed and the magnetic encoder scale is arranged at the stator.

In this desired device, the field magnet is formed such that a region providing the maximum intensity of the magnetic field produced by the field magnet and a region providing the minimum intensity of the magnetic field produced by the field magnet are formed in a region around the stator excluding a region above the upper surface of the stator, the first sensor arranged at the movable piece and opposed to the field magnet is located in the region providing the maximum intensity of the magnetic field, the magnetic encoder scale formed at the stator is located in the region providing the minimum intensity of the magnetic field, and the second sensor arranged at the movable piece is opposed to the encoder scale.

Linear drive devices as described in the following paragraphs (a) and (b) may be specific examples of the above linear drive device.

(a) The first sensor opposed to the field magnet is located beside one side surface of the stator, the magnetic encoder scale is arranged at the other side surface of the stator, the second sensor opposed to the encoder scale is located beside the other side surface of the stator, and the field magnet is formed so as to attain the maximum intensity of the magnetic field at a position beside the one side surface of the stator and the minimum intensity of the magnetic field at a position beside the other side surface of the stator.

(b) The magnetic encoder scale is arranged at the lower surface of the stator, the first sensor opposed to the field magnet is located beside one side surface of the stator, the second sensor opposed to the encoder scale is located under the lower surface of the stator, and the field magnet is formed so as to attain the maximum intensity (or substantially maximum intensity) of the magnetic field at positions beside the side surfaces of the stator and the minimum intensity of the magnetic field at a position under the lower surface of the stator.

If the first sensor opposed to the field magnet can be located in a region other than the region in which the field magnet attains the maximum intensity, the linear drive device can have the following structures (c) and (d).

(c) The field magnet is adapted to attain the maximum intensity of the magnetic field at a position beside one side surface of the stator and the minimum intensity of the magnetic field at a position beside the other side surface, the magnetic encoder scale is formed at the other side surface of the stator, the first sensor opposed to the field magnet is located under the stator, and the second sensor opposed to the magnetic encoder scale is located beside the other side surface.

(d) The field magnet is adapted to attain the maximum intensity of the magnetic field at a position above the upper surface of the stator and the minimum intensity of the magnetic field at a position under the lower surface of the stator, the magnetic encoder scale is formed at the lower surface of the stator, the first sensor opposed to the field magnet is located beside the stator, and the second sensor opposed to the magnetic encoder scale is located under the stator.

Even in the linear drive devices having the above structures (c) and (d), the first and second sensors are located at the positions which can effectively avoid an influence of the heat generated by the armature coil, as is done also in the linear drive devices of the above items (a) and (b), so that the linear drive devices in (c) and (d) can likewise have an improved operation reliability.

In each of the linear drive devices of the above items (a), (b), (c) and (d), the magnetic encoder scale arranged at the stator is located at a position where the magnetic field produced by the field magnet attains the minimum intensity, so that a magnetic influence exerted by the field magnet on the magnetic encoder scale and the second sensor opposed thereto is suppressed, and therefore the operation can be performed accurately and smoothly.

The magnetic flux distribution may be absent at the position where the magnetic field produced by the field magnet attains the minimum intensity. For example, if the magnetic encoder is employed, and the magnetic encoder scale is arranged at the stator, the field magnet and the magnetic encoder scale may be spaced from each other for suppressing magnetic interference of the field magnet with the magnetic encoder scale.

In the linear drive device, the movable piece may be provided with a base plate or board for carrying the first and second sensors.

Examples of such linear drive devices are as follows.

(i) In the linear drive device, the movable piece may be provided with a board arranged laterally outside the armature coil, the first sensor opposed to the field magnet is mounted on the board and is located laterally outside the armature coil, the second sensor is mounted on the board, and the encoder scale is arranged at a position opposed to the second sensor.

In this case, the board may be provided with one or more circuit portions for energizing the armature coil to drive the movable piece. However, it is preferable to arrange the first and second sensors at a region on the board other than a region above this circuit portion for effectively avoiding an influence of the heat generated by the circuit portion on the first and second sensors.

(ii) In the linear drive device, the movable piece may be provided with a board arranged under the armature coil, the first sensor opposed to the field magnet is mounted on the board and is located under the armature coil, the second sensor is mounted on the board, and the encoder scale is arranged at a position opposed to the sensor.

In either of the linear drive devices of the above items (i) and (ii), the encoder scale may be arranged at a position outside the stator.

In either of the linear drive devices of the above items (i) and (ii), the encoder scale may be a magnetic encoder scale, and the second sensor may be a magnetic sensor reading magnetic information on the encoder scale. Alternatively, the encoder scale may be an optical encoder scale, and the second sensor may be an optical sensor reading optical information on the encoder scale.

In both the linear drive devices of the above items (i) and (ii), the first and second sensors are arranged at positions which can effectively avoid an influence of the heat generated by the armature coils.

The board may be provided with a circuit pattern for establishing a predetermined connection of coil groups forming the armature coil, in which case the connection of the coil groups can be established by this circuit pattern.

Any one of the linear drive devices described above can be utilized for linearly driving a driven object, i.e., an object to be driven in a predetermined direction.

Such a driven object may be a slider carrying an optical part for reading an original document image in an image reading apparatus.

If the movable piece is connected to one of the opposite ends of the driven object spaced from each other in a direction crossing the drive direction of the driven object (e.g., the foregoing slider), at least the second sensor between said first and second sensors may be arranged on or near a central axis of a yawing operation of the movable piece during driving of the driven object. As an example of the arrangement near the central axis of the yawing operation, the second sensor may be arranged on or near a plane which contains the central axis and is perpendicular to the moving direction of the movable piece.

Owing to arrangement of the second sensor on or near the central axis of the yawing operation of the movable piece, it is possible to suppress deviation and/or instability in the positional relationship between the second sensor and the encoder scale which has a small width and provides a smaller magnetic force than the field magnet, even when the movable piece yaws. Thereby, the linear drive device can be driven accurately and smoothly under control.

Also, the first sensor may be arranged on or near the central axis of the yawing operation of the movable piece, whereby the linear drive device can be driven further smoothly and accurately under control.

Specific examples of the linear drive device of the second type will now be described below with reference to the drawings.

Figure 13:
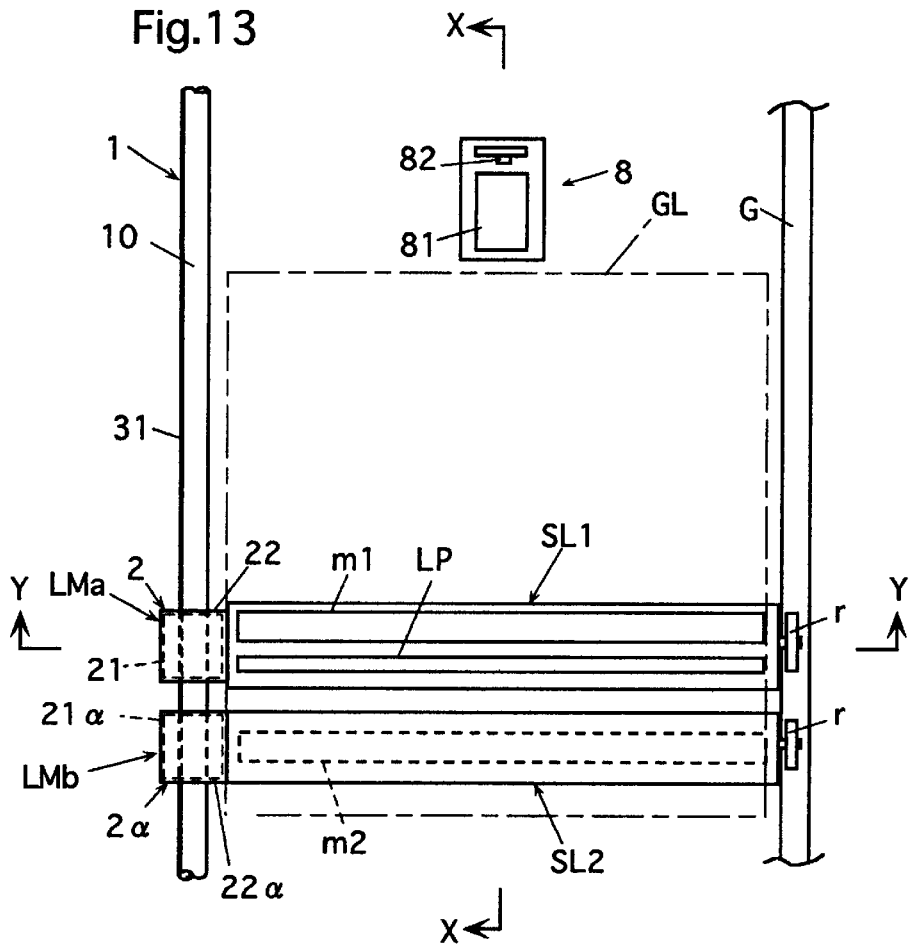
FIG. 13 is a schematic plan of an image reading apparatus equipped with a linear drive device of another embodiment of the invention.
Figure 14:
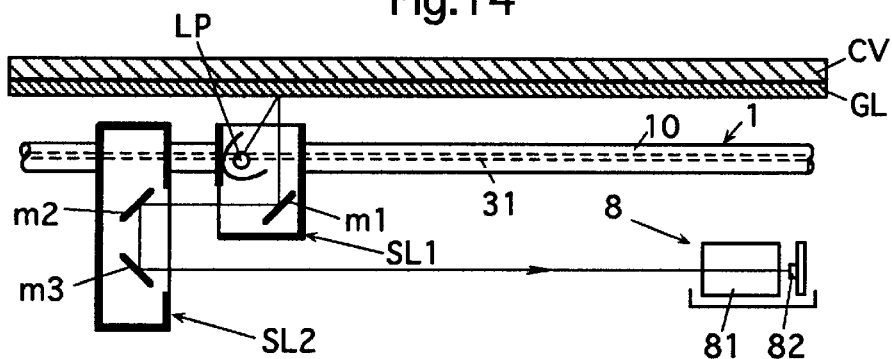
FIG. 14 is a schematic cross section of the image reading apparatus taken along line X—X in FIG. 13.
Figure 15:
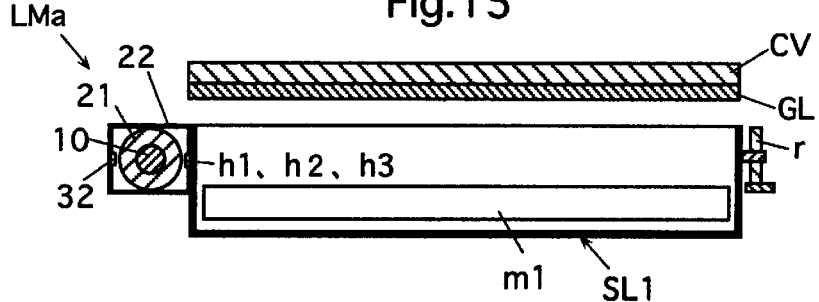
FIG. 15 is a schematic cross section of the image reading apparatus taken along line Y—Y in FIG. 13.

FIGS. 13 to 15 show, by way of example, an image reading apparatus equipped with a linear drive device according to the invention. FIG. 13 is a schematic plan of the apparatus. FIG. 14 is a schematic cross section taken along line X—X in FIG. 13. FIG. 15 is a schematic cross section taken along line Y—Y in FIG. 13.

The image reading apparatus shown in FIGS. 13 to 15 utilizes the linear drive device of the second type according to the invention for driving two sliders carrying optical parts, which will be described later in detail.

This image reading apparatus is provided at it upper portion with a transparent table glass GL on which an original document is laid. An openable cover CV is arranged over the original table glass GL. In FIG. 13, the cover CV is not shown. Under the table glass GL, there are arranged the two sliders SL1 and SL2, which carry optical parts and can move parallel to the table glass GL for optically scanning the original laid over the glass table GL.

The slider SL1 is coupled to the movable piece 2 of the linear drive device LMa, and the slider SL2 is couple to the movable piece 2α of the linear drive device LMb. These linear drive devices have the substantially same structures. Each of the movable pieces 2 and 2α is fitted around the shaft member 10 extending parallel to the table glass GL, i.e., the moving direction of the sliders SL1 and SL2, and can move along the shaft member 10. The shaft member 10 is fixed at a constant position by support members (not shown), and is provided with the field magnet. The shaft member 10 forms the stator 1 common to both the linear drive devices LMa and LMb. The movable pieces 2 and 2α have armature coils 21 and 21α fitted around the stator 1, respectively. The linear drive devices LMa and LMb are of a so-called moving coil type.

When the armature coil 21 of the linear drive device LMa is energized, the movable piece 2 having the armature coil 21 can be driven along the stator 1 as a result of an interaction between the current flowing through the coil 21 and the magnetic field which is produced by the field magnet formed at the shaft member 10. Likewise, when the armature coil 21α of the linear drive device LMb is energized, the movable piece 2α can be driven along the stator 1.

The slider SL1 carries the optical parts, and more specifically an illumination lamp LP for emitting light beams onto an original laid over the table glass GL, and a reflection mirror m1 for leading the light beams reflected by the original toward the slider SL2. The illumination lamp LP in this embodiment is a fluorescent lamp. The roller r is arranged at an end of the slider SL1 remote from the other end coupled to the movable piece 2. The roller r can roll over the plate-like guide member G arranged parallel to the table glass GL and the stator 1. owing to the above structure, the slider SL1 can move while maintaining a predetermined attitude.

The slider SL2 carries the optical parts, and more specifically the reflection mirrors m2 and m3 for leading the image light beams reflected by the reflection mirror m1 on the slider SL1 to the reading unit 8. The slider SL2 is provided with a roller r in a manner similar to the slider SL1, and thereby can maintain a predetermined attitude during movement.

The reading unit 8 includes a lens 81 for focusing the image light beams led by the reflection mirror m3 on the slider SL2, and an imaging element (CCD) 82 for reading the focused image light beams. The unit 8 may be replaced with reflection means for leading the light beams coming from the mirror m3 to a photosensitive member for image formation, in which case the image reading apparatus can be applied to an analog copying machine.

When reading the image on the original document which is laid at a predetermined position on the table glass GL, the illumination lamp LP on the slider SL1 is turned on, and the sliders SL1 and SL2 are driven parallel to the table glass GL by the linear drive devices LMa and LMb for scanning the original. The sliders SL1 and SL2 are driven at a speed ratio of, e.g., 2:1. In this operation, the light beams, which are emitted from the illumination lamp LP and reflected by the original, are lead by the mirrors m1, m2 and m3 to the reading unit 8. In the reading unit 8, the reflected light beams are focused on the CCD 82 by the focus lens 81, and the CCD 82 successively reads the original images.

Description will now be given in detail on the linear drive devices LMa and LMb coupled to the sliders SL1 and SL2, respectively. As already described, these devices have the substantially same structures. Therefore, only the linear drive device LMa will be discussed by way of example.

Figure 16:
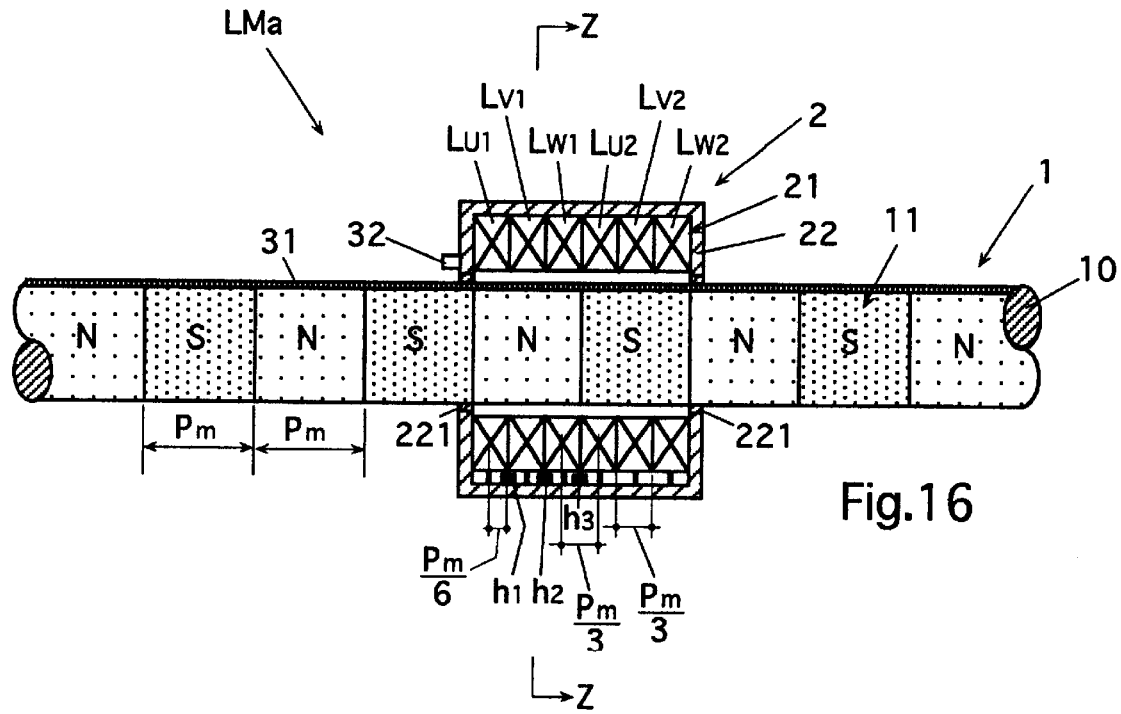
FIG. 16 is a schematic plan of the linear drive device shown in FIG. 13 and others with a movable piece cut away.
Figure 17:
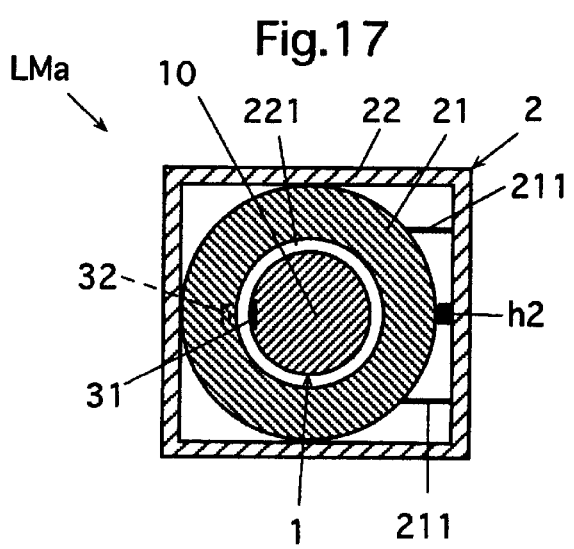
FIG. 17 is a schematic cross section of the linear drive device taken along line Z—Z in FIG. 16.

FIG. 16 is a schematic plan of the linear drive device LMa with the movable piece portion cut away. FIG. 17 is a schematic cross section of the linear drive device LMa taken along line Z—Z in FIG. 16.

The linear drive device LMa shown in FIGS. 16 and 17 is of a so-called shaft type.

As already described, the linear drive device LMa includes the straight shaft member 10 provided with the magnet for the field magnet, and also includes the armature coil 21 fitted around the member 10. The linear drive device LMa is of a so-called moving coil type, and includes the stator formed of the shaft member 10 provided with the field magnet and arranged at a fixed position as well as the movable piece, of which the major portion is formed of the armature coil 21, to be moved along the stator. The linear drive device LMa further includes the magnetic encoder scale 31 formed at the shaft member 10. Similarly to the field magnet 11, this encoder scale 31 is common to the linear drive devices LMa and LMb.

Figure 18:
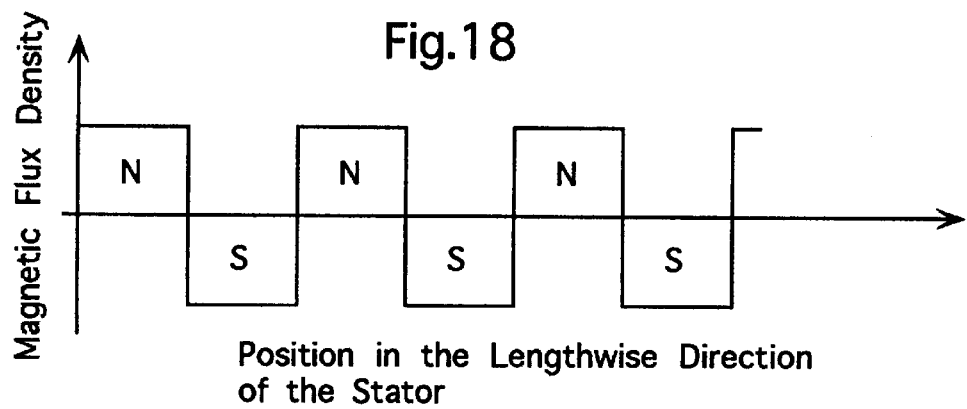
FIG. 18 shows, by way of example, a magnetic flux distribution formed by a field magnet in a lengthwise direction of the stator.

The shaft member 10 is made of, e.g., metal containing Fe—Cr—Co or mangan aluminum (MgAl) which allows machining and magnetization. The stator member 10 has a circular section and a machined smooth surface. The shaft member 10 is magnetized at an equal pitch to provide preferably a magnetic flux distribution of a substantially square form in the lengthwise direction of the stator 1 as shown in FIG. 18. Thereby, the shaft member 10 is provided with a magnetized portion for drive in which N- and S-type magnetic poles having equal magnetic pole widths (length in the lengthwise direction of the stator) Pm are arranged in its lengthwise direction to form the field magnet 11.

Figure 19:
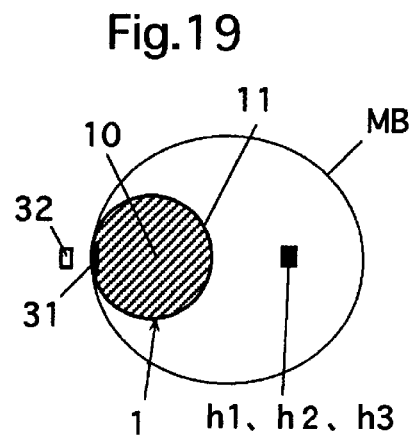
FIG. 19 shows a magnetic flux distribution on a section perpendicular to the lengthwise direction of the stator.

In a section shown in FIG. 19, which is perpendicular to the lengthwise direction of the stator 1, the field magnet 11 produces a magnetic field providing a magnetic flux distribution MB, which attains a maximum intensity at one lateral side (near the slider SL1 in the illustrated example) of the stator 1, and attains a minimum intensity at the opposite side (remote from the slider SL1). In other words, the magnetization is performed to provide the magnetic field of the maximum intensity at one side (near the slider SL1 in the illustrated example) of the stator 1, and the magnetic field of the minimum intensity at the other side (remote from the slider SL1).

The magnetic encoder scale 31, which is formed on the stator 1 along its lengthwise direction, is located at the foregoing other side of the stator 1 where the magnetic field of the field magnet 11 attains the minimum intensity, as shown in FIGS. 16, 17 and 19. The magnetic encoder scale 31 is formed by providing on the stator 1 the magnetized portion for position sensing having the N- and S-type magnetic poles at a smaller pitch than the magnetic pole pitch of the field magnet 11.

As shown in FIG. 16, the width Pm, in the lengthwise direction of the stator, of each magnetic pole of the field magnet 11, i.e., the magnetic pole pitch Pm is 30 mm in this embodiment. The magnetic pole pitch of the magnetic encoder scale is 200 $\mu$m in this embodiment.

The armature coil 21 in this embodiment has two coil groups each of which is formed of three coils, i.e., U-, V- and W-phase coils. The first and second coil groups are arranged in this order along the lengthwise direction of the stator. The first coil group is formed of coils $L_{U1}$, $L_{V1}$ and $L_{W1}$ which are arranged in this order along the lengthwise direction of the stator. The second coil group is formed of coils $L_{U2}$, $L_{V2}$ and $L_{W2}$ which are arranged in this order along the lengthwise direction of the stator.

Each of the coils in these coil groups has a ring-like form, and is fitted around the stator 1. Each coil in this embodiment has a width of ⅓ of the magnetic pole pitch Pm, although not restricted thereto. The center of each coil is shifted, in the lengthwise direction of the stator, from the center of the coil neighboring thereto by ⅓ of Pm. The coils forming the armature coil 21 in this embodiment are fixed together by adhesive coating the outer peripheral surfaces thereof.

The armature coil 21 fitted around the stator 1 is accommodated in a hollow frame 22 having a rectangular parallelepiped form, and is supported by the inner peripheral surface of the frame 22. The armature coil 21 and the frame 22 are fixed together. The frame 22 is provided at its opposite ends, in the lengthwise direction of the stator, with bearings 221 which are slidably fitted around the stator 1, so that the armature coil 21 and the frame 22 fixed together can smoothly move along the stator 1 owing to the bearings 221. The armature coil 21 and the frame 22 fixed together form the movable piece 2 of the linear drive device LMa.

Hall elements $h_1$, $h_2$ and $h_3$, which are a kind of magnetoelectric elements issuing electric signals depending on the polarities of the magnetic poles, are arranged for detecting the positional relationships in the lengthwise direction of the stator between the coils and the magnetic poles of the field magnet 11, and thereby energizing the coils in accordance with positions thereof and the polarities of magnetic poles of the field magnet 11 opposed to the coils, respectively.

As shown in FIGS. 16, 17 and 19, each Hall element is located outside the armature coil 21 and is opposed to the region where the magnetic field of the field magnet 11 attains the maximum intensity and, in other words, to the lateral side surface of the stator 1 near the slider SL1, and is supported by the inner surface of the frame 22.

More specifically, each Hall element opposed to the field magnet 11 is arranged at the following position in the lengthwise direction of the stator. In the lengthwise direction of the stator 1, the Hall element $h_1$ is arranged at the position shifted rightward in FIG. 16 from the center of the coil $L_{U1}$ by Pm/6. Likewise, the Hall element $h_2$ is arranged at the position shifted rightward in FIG. 16 from the center of the coil $L_{V1}$ by Pm/6, and the Hall element $h_3$ is arranged at the position shifted rightward in FIG. 16 from the center of the coil $L_{W1}$ by Pm/6.

Each Hall element is made of a material containing InSb, which can produce an output signal of a large magnitude even if the armature coil 21 is interposed between the Hall element and the field magnet 11, although not restricted thereto.

The frame 22 of the movable piece 2 carries a magnetic sensor 32 which is located outside the armature coil 21 and is opposed to the encoder scale 31. In this embodiment, the magnetic sensor 32 is an MR element.

The movable piece 2$\alpha$ of the linear drive device LMb has a structure similar to that of the movable piece 2, and likewise carries Hall elements forming the sensors for the field magnet and an MR element forming the sensor for the encoder.

Figure 20:
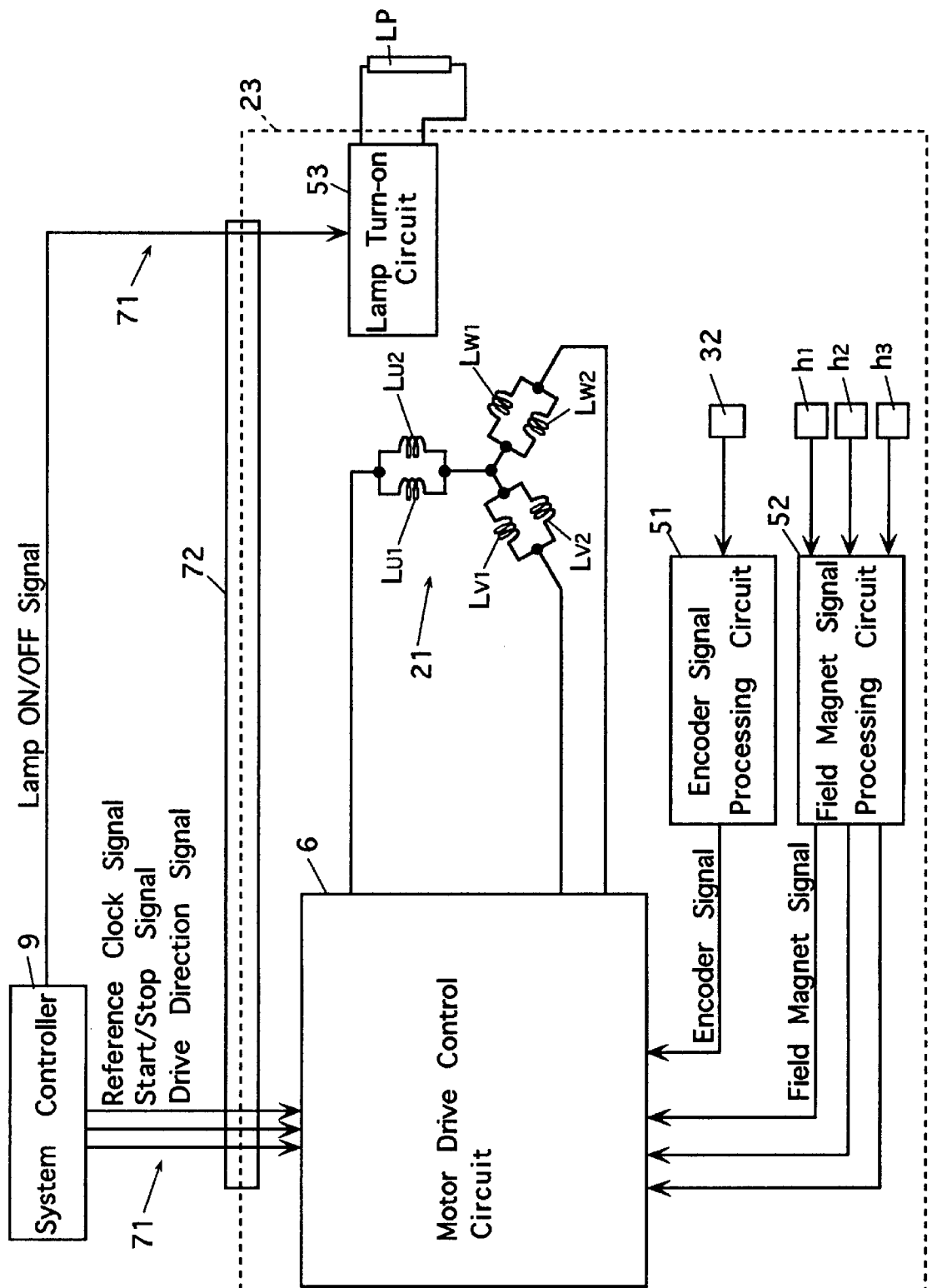
FIG. 20 is a block diagram showing, by way of example, a circuit for power supply control of the linear drive device shown in FIG. 16.

FIG. 20 is a schematic block diagram of an electric circuit related to the linear drive device LMa.

As shown in FIG. 20, each coil in the armature coil 21 is connected to the drive control circuit 6 through a predetermined connection. There are also provided an encoder signal processing circuit 51 which can binarize the output signal sent from the magnetic sensor (MR element) 32, and a field magnet signal processing circuit 52 which can binarize the output signals of the Hall elements $h_1$, $h_2$ and $h_3$. These circuits 51 and 52 are connected to the drive control circuit 6. The drive control circuit 6 controls the power supply to the armature coil 21 based on the encoder signal and field magnet signal issued from the encoder signal processing circuit 51 and the field magnet signal processing circuit 52, respectively. There is further provided a lamp turn-on circuit 53 for turning on the illumination lamp LP mounted on the slider SL1.

The drive control circuit 6, encoder signal processing circuit 51, field magnet signal processing circuit 52 and lamp turn-on circuit 53 are mounted on a single circuit-board 23.

Although the circuit-board is arranged outside the movable piece, it may be mounted on the movable piece. If the circuit-board is to be mounted on the movable piece, the Hall elements and the MR element may also be mounted on the circuit-board. However, the Hall elements and the MR element, which are susceptible to the heat, are preferably mounted on a region other than a region above a circuit portion on the board, which generates signifcant heat, or is provided with a radiator plate.

The drive control circuit 6 and the lamp turn-on circuit 53 are arranged at fixed positions outside the movable piece 2, and operate to drive the linear drive device and turn on the illumination lamp LP respectively based on the instruction sent from the system controller 9 performing entire control of the image reading apparatus.

The system controller 9 outside the movable piece 2 and the circuits on the circuit-board 23 are connected through a harness 71, which is connected to the circuit-board 23 through a pair of male and female connectors 72.

In this embodiment, the harness 71 transmits the following signals. It transmits a power supply voltage to the circuits formed on the circuit-board 23 as well as Hall elements $h_1$, $h_2$ and $h_3$ and the MR element 32. A start/stop signal indicating start and stop of drive of the linear drive device, a drive direction signal indicating the dive direction and a reference clock signal are transmitted from the system controller 9 to the control circuit 6. Further, a lamp on/off signal indicating turn on/off of the illumination lamp is transmitted from the system controller 9 to the lamp turn-on circuit 53. The foregoing circuits on the circuit-board 23 will be successively described below.

The first set of the U-, V- and W-phase coils $L_{U1}$, $L_{V1}$ and $L_{W1}$ and the second set of the U-, V- and W-phase coils $L_{U2}$, $L_{V2}$ and $LW_2$ of the armature coil 21 are connected as follows on the movable piece 2 or circuit-board 23. The coils of the same phases, i.e., U-, V- and W-phases are connected in parallel with each other, and these parallel connections of the coils are star-connected.

The encoder signal processing circuit 51 is provided for binarizing (digitizing) the electric signal issued from the MR element 32 and thereby producing a digital (binary) signal.

The position sensing, speed detection and drive control for the movable piece 2 can be performed based on the signal binarized (digitized) by the encoder signal processing circuit 51. In this embodiment, this signal is utilized for PLL control (phase lock control) by the drive control circuit 6, as will be described later.

The field magnet signal processing circuit 52 is provided for binarizing (digitizing) the electric signals issued from the Hall elements $h_1$, $h_2$ and $h_3$ and thereby producing digital signals.

Based on the field magnet signals binarized (digitized) by the field magnet signal processing circuit 52, the drive control circuit 6 in this embodiment controls the power supply to the armature coil 21 in a manner which will be described later.

Figure 21:
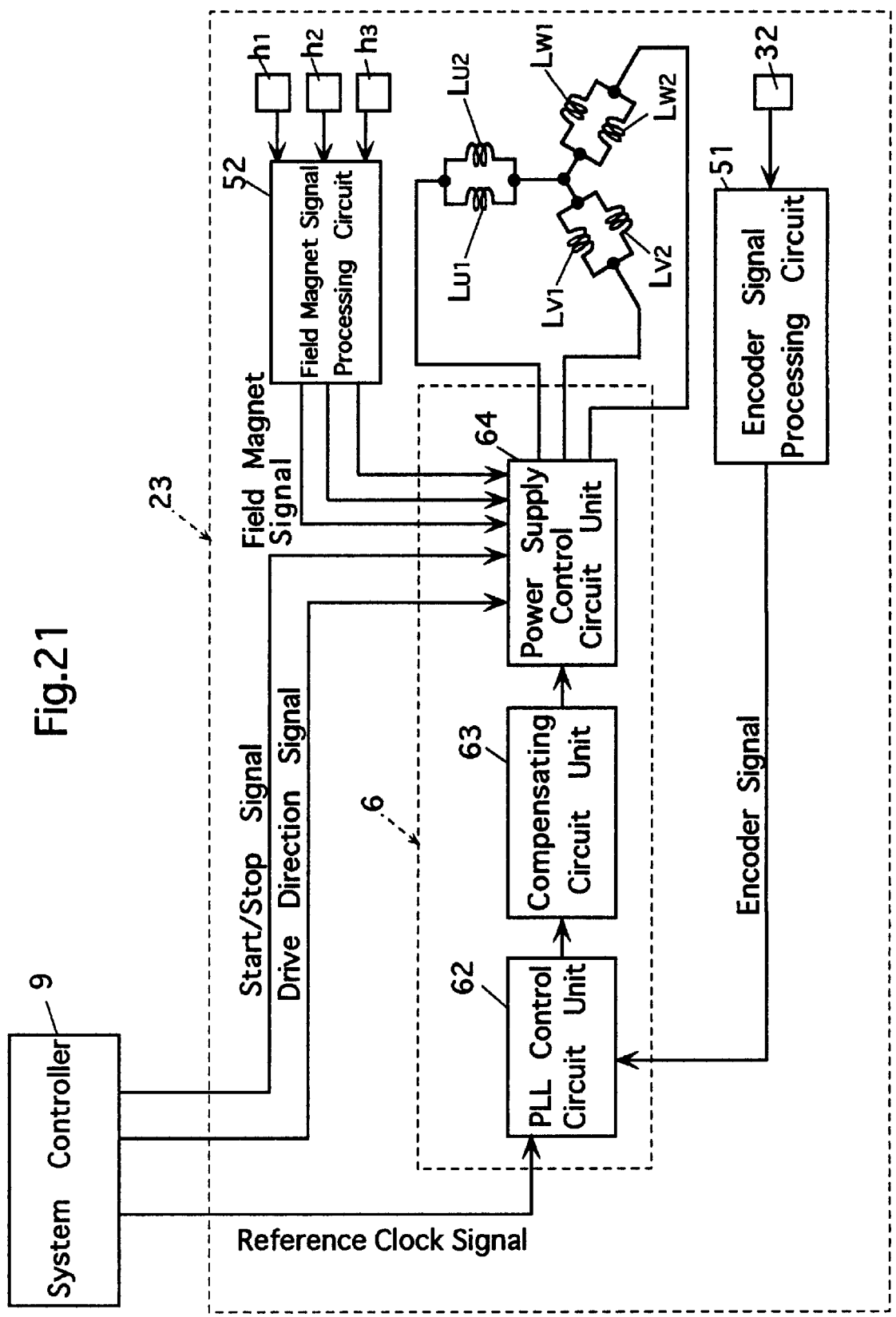
FIG. 21 is a circuit block diagram showing more specifically a drive control circuit portion in the circuit shown in FIG. 20.

FIG. 21 is a schematic block diagram showing an example of an internal structure of the drive control circuit 6.

The drive control circuit 6 has a PLL control circuit unit (phase lock control circuit unit) 62, a compensating circuit unit 63 and a power supply control circuit unit 64.

The PLL control circuit unit 62 is supplied from the system controller 9 with a reference clock signal of a frequency corresponding to the intended speed of the movable piece 2.

The PLL control circuit unit 62 is fed back with the encoder signal which is issued from the MR element 32 and is binarized (digitized) by the encoder signal processing circuit 51 as a signal representing an actual moving speed of the movable piece 2.

The PLL control circuit unit 62 issues to the compensating circuit unit 63 a signal corresponding to a phase difference between the reference clock signal sent from the system control unit 9 and the encoder signal representing the moving speed sent. from the encoder signal processing circuit 51.

The compensating circuit unit 63 compensates the lead or retard on the transmission system, and issues to the power supply control circuit unit 64 a signal which is compensated in accordance with the phase difference between the reference clock signal and the moving speed signal.

Figure 22:
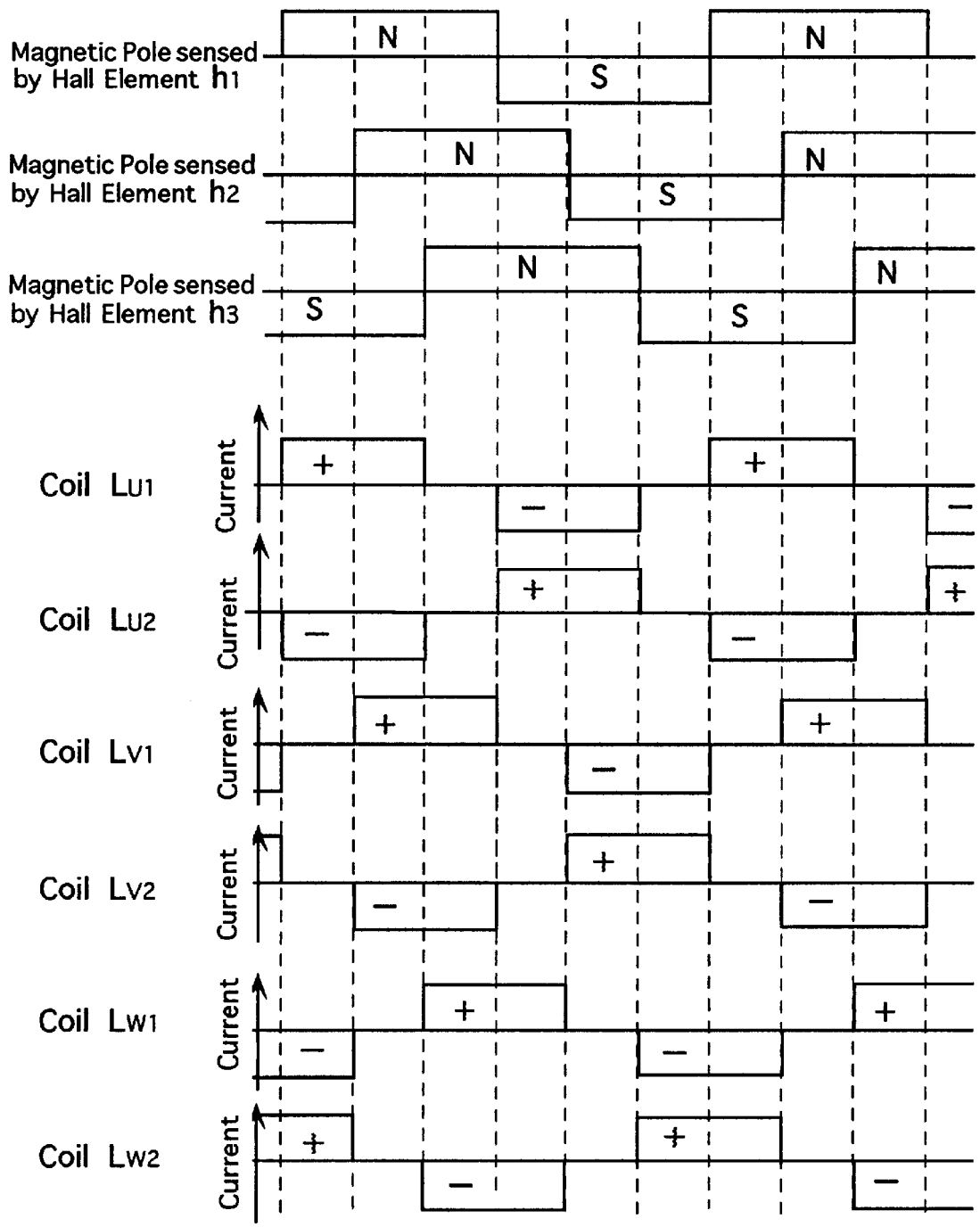
FIG. 22 shows a relationship between a magnetic pole sensed by each Hall element and power supply timing for each coil in an operation of driving leftward in FIG. 16 the movable piece of the linear drive device shown in FIG. 16.
Figure 23:
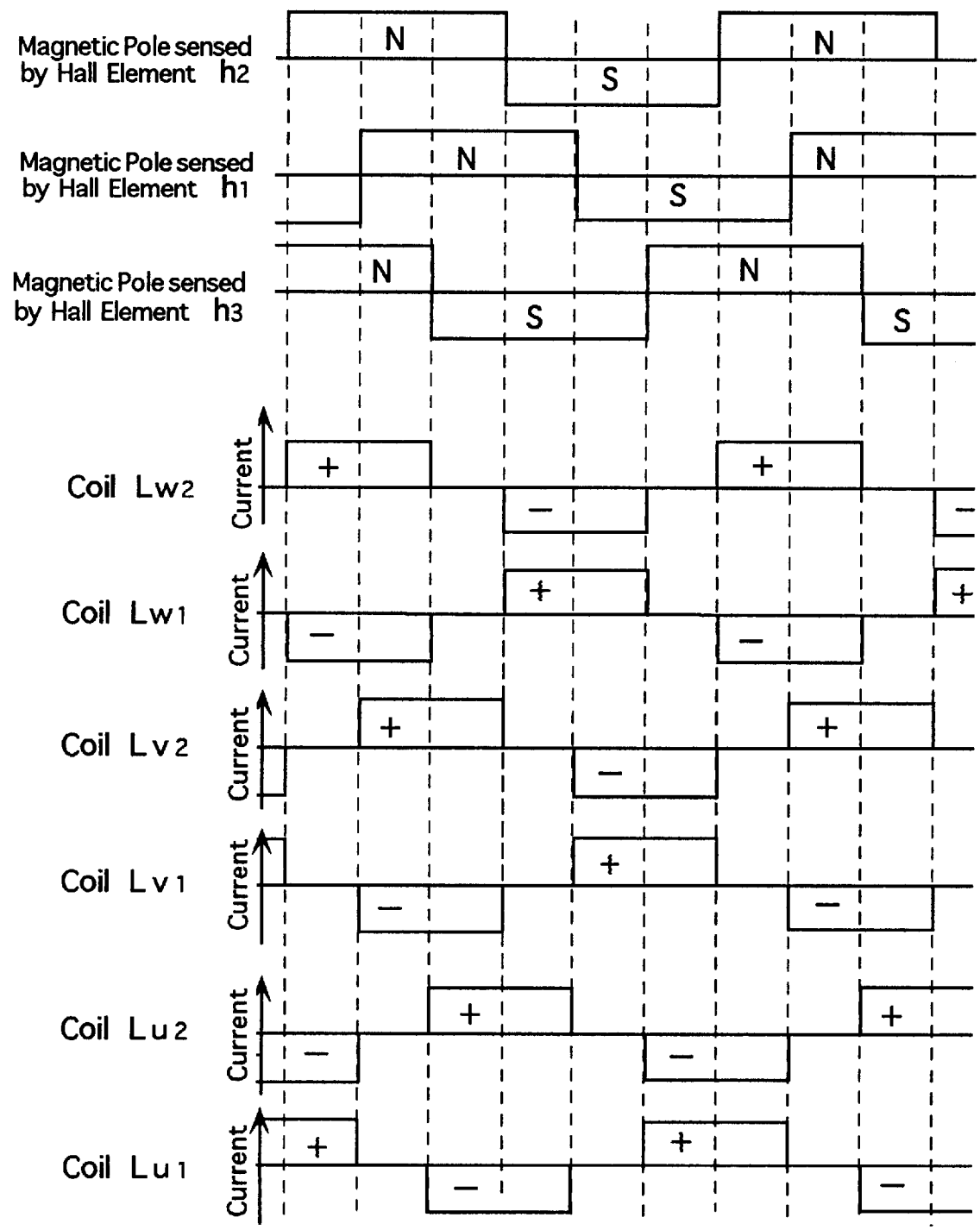
FIG. 23 shows a relationship between the magnetic pole sensed by each Hall element and the power supply timing for each coil in an operation of driving rightward in FIG. 16 the movable piece of the linear drive device shown in FIG. 16.

The power control circuit unit 64 supplies the coil of each phase with a current corresponding to the compensated signal based on the field magnet signal which is binarized (digitized) by the field magnet signal processing circuit 52, and energizes each coil in accordance with the timing shown in FIGS. 22 and 23. Thereby, the coil of each phase is supplied with a current, which acts to match the phase of the reference clock signal corresponding to the intended speed with the phase of the signal corresponding to the actual moving speed of the movable piece 2, so that the movable piece 2 can be driven at the intended speed.

FIG. 22 shows timing for power supply to the respective coils for driving the movable piece 2 leftward in FIG. 16, and FIG. 23 shows timing for power supply to the respective coils for driving the movable piece 2 rightward in FIG. 16. When power supply is performed in accordance with such timing, each coil is supplied with a constant current in a direction, which enables generation of an electromagnetic force in the drive direction, in accordance with the polarity of the magnetic pole opposed to the coil for a predetermined period, during which the center of the coil in the lengthwise direction of the stator 1 moves from the position, which is shifted in the drive direction by Pm/6 from the upstream end, in the drive direction, of the magnetic pole of the field magnet 11, to the position which is shifted therefrom by 2Pm/3 in the drive direction. Thus, when each coil is energized, the coil is entirely located at a position opposed to only one of the magnetic poles (i.e., N- or S-type magnetic pole), and is not located over both the N- and S-type magnetic poles. Thereby, the current supplied to each coil is not converted into a drive force in the direction opposite to the intended drive direction of the movable piece 2, and the supplied current is entirely converted into the drive force for driving the movable piece 2 in the intended direction, resulting in a high efficiency. For similar reasons, the drive force hardly varies when the movable piece 2 is driven along the stator 1.

Although not shown in the figure, the linear drive device LMb is provided with a circuit-board including circuits similar to the drive control circuit 6, encoder signal processing circuit 51 and field magnet signal processing circuit 52 in the linear drive device LMa. This circuit-board is connected to the system control unit 9 through a harness and connectors, so that the linear drive device LMb operates similarly to the drive device LMa based on the instruction sent from the system control unit 9.

The linear drive device LMa described above employs, as the field magnet sensor, the InSb-contained Hall elements $h_1$, $h_2$ and $h_3$ which have poor temperature properties and produce the output voltage which tend to vary to a large extent with temperature, and also employs, as the encoder sensor, the MR element 32 of which output lowers with rising of the temperature. However, these elements are arranged beside the opposite side surfaces of the stator 1, and thus are not arranged at a region above the upper surface of the stator 1 which is subjected to the greatest extent to the heat generated by the armature coil 21. Further, these elements are arranged outside the armature coil 21. Therefore, even if the linear drive device LMa is operated for a long time, these elements are restrained from being affected by the heat generated by the energized armature coil 21, and therefore an intended information sensing accuracy can be kept, so that the linear drive device LMa operates accurately and smoothly, and can have a high reliability.

As shown in FIG. 19, the Hall elements $h_1$, $h_2$ and $h_3$ are arranged at a side opposite to the MR element 32 with the stator 1 therebetween, and the magnetic encoder scale 31 formed on the stator 1 is located at a region where the magnetic field produced by the field magnet 11 attains the minimum intensity. The MR element 32 is opposed to the magnetic encoder scale 31 thus arranged. Therefore, magnetic interference of the field magnet 11 with the encoder scale 31 and the MR element 32 is suppressed, and thereby the MR element 32 can accurately sense the magnetic information on the encoder scale 31 without an error. This also enables an accurate and smooth operation of the linear drive device LMa as well as a high reliability thereof.

As shown in FIG. 19, the Hall elements $h_1$, $h_2$ and $h_3$ opposed to the field magnet 11 are located at the region where the magnetic field of the field magnet 11 attains the maximum intensity. Therefore, it is possible to increase the outputs of the Hall elements, which are produced based on information sensed from the field magnet 11. This also enables accurate control of the power supply to the armature coil 21 without an error, and therefore the linear drive device LMa can have a high operation reliability.

Since the magnetic field of the field magnet 11 attains the maximum intensity at the side near the slider SL1, the drive force acting on the movable piece 2 is larger at a region near the slider SL1 compared with that at a region remote from the slider SL1 with the stator 1 therebetween. This achieves the following advantage. When the slider SL1 is driven by the linear drive device LMa, an end thereof remote from the connection to the movable piece may tend to move relatively slowly due to an inertial force of the slider, a moving resistance at the end and other factors. Even in this case, a moment in a direction compensating the slow movement acts on the movable piece 2, so that the slider SL1 can maintain an accurate attitude during movement.

The same advantage as that of the linear drive device LMa can be achieved by the linear drive device LMb.

According to the linear drive device described above, the field magnet on the stator produces the magnetic field providing the magnetic flux distribution shown in FIG. 19, and the sensors for the field magnet and the encoder are arranged as shown in FIG. 19. Instead of them, distributions and arrangements shown in FIGS. 24 to 26 may be employed. Although the distributions and arrangements shown in FIGS. 24 to 26 are employed in a linear drive device corresponding to the linear drive device LMa, distributions and arrangements similar to them may be employed in a linear drive device corresponding to the linear drive device LMb.

Figure 24:
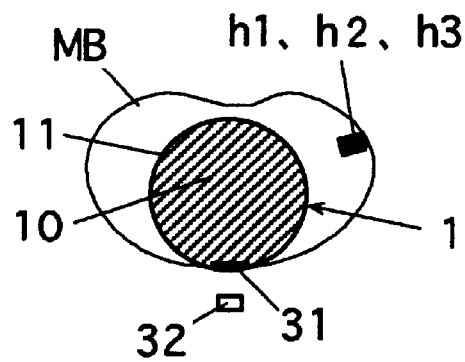
FIG. 24 shows another example of the magnetic flux distribution of the field magnet of the stator and an example of arrangement of the sensors corresponding to the same.

In the structure shown in FIG. 24, the field magnet 11 is adapted to form the magnetic field having a magnetic flux distribution MB, which attains the maximum magnetic flux at regions opposed to the opposite side surfaces of the stator 1, and attains the minimum magnetic flux at a region under the lower surface thereof. In other words, the field magnet 11 is formed so as to provide the magnetic field, which attains the maximum intensity (or the substantially maximum intensity) at regions opposed to the opposite side surfaces of the stator 1 and attains the minimum intensity at a region under the lower surface. The Hall elements $h_1$, $h_2$ and $h_3$ opposed to the field magnet 11 are arranged at the region where the magnetic field of the field magnet 11 attains the maximum intensity, and the magnetic encoder scale 31 is formed at the lower surface of the stator 1 where the magnetic field of the field magnet 11 attains the minimum intensity. The MR element 32 is opposed to the encoder scale 31 thus arranged.

Figure 25:
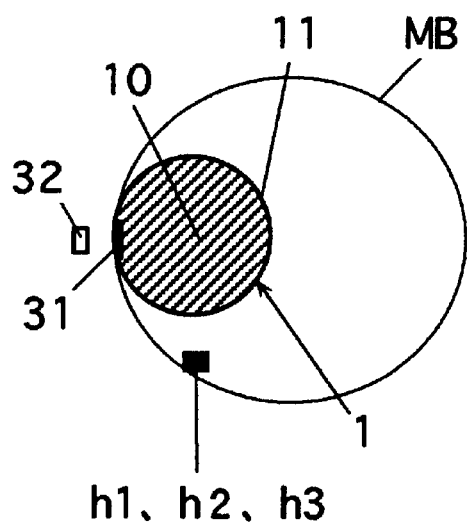
FIG. 25 shows still another example of arrangement of the sensors corresponding to the magnetic flux distribution of the field magnet of the stator shown in FIG. 19.

According to the setting shown in FIG. 25, the field magnet 11 is formed so as to produce the magnetic field having the magnetic flux distribution MB, which attains the maximum magnetic flux at a region opposed to one side surface of the stator 1 (near the slider SL1), and attains the minimum magnetic flux at a region opposed to the other side surface. In other words, the field magnet 11 is formed so as to produce the magnetic field which attains the maximum intensity at the region opposed to the one side surface of the stator 1, and attains the minimum intensity at the region opposed to the other side surface. The Hall elements $h_1$, $h_2$ and $h_3$ opposed to the field magnet 11 are arranged under the stator 1, and the magnetic encoder scale 31 is formed at the other side surface of the stator 1 where the magnetic field of the field magnet 11 attains the minimum intensity. The MR element 32 is opposed to the encoder scale 31 thus arranged.

Figure 26:
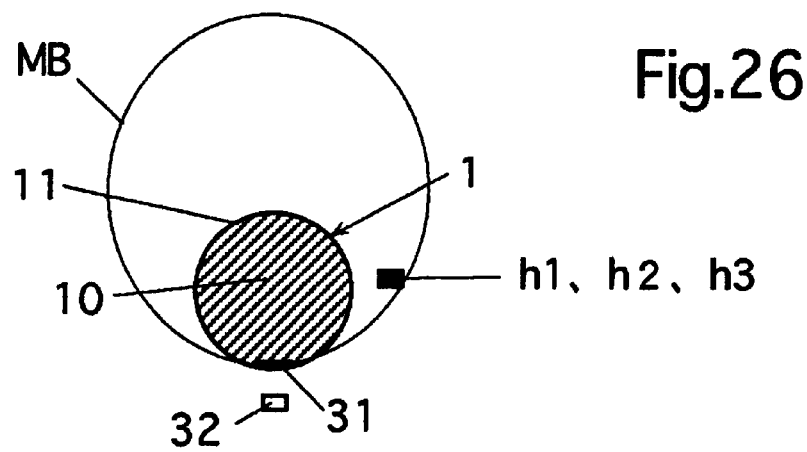
FIG. 26 shows another example of the magnetic flux distribution of the field magnet of the stator and another example of arrangement of the sensors corresponding to the same.

According to the setting shown in FIG. 26, the field magnet 11 is formed so as to produce the magnetic field having the magnetic flux distribution MB, which attains the maximum magnetic flux at a region above the upper surface of the stator 1, and attains the minimum magnetic flux at a region under the lower surface. In other words, the field magnet 11 is formed so as to produce the magnetic field, which attains the maximum intensity at the region above the upper surface of the stator 1, and attains the minimum intensity at the region under the lower surface. The Hall elements $h_1$, $h_2$ and $h_3$ opposed to the field magnet 11 are arranged beside one side surface of the stator 1, and the magnetic encoder scale 31 is formed at the lower surface of the stator 1 where the magnetic field of the field magnet 11 attains the minimum intensity. The MR element 32 is opposed to the encoder scale 31 thus arranged.

In any one of the settings shown in FIGS. 24 to 26, the Hall elements $h_1$, $h_2$ and $h_3$ and the MR element 32 are arranged at the regions on the movable piece 2 except for a region above the upper surface of the stator 1 which is subjected to the heat generated by the armature coil 21. Therefore, even if the linear drive device is operated for a long time, these elements are restrained from being affected by the heat generated by the energized armature coil 21, so that the linear drive device can operate accurately and smoothly with a high reliability.

In any one of the settings shown in FIGS. 24 to 26, the magnetic encoder scale 31 is arranged at a region on the stator 1 where the field magnet 11 attains the magnetic field of the minimum intensity, and thereby the influence by the magnetism generated from the field magnet 11 is suppressed, which is also an advantage.

The setting shown in FIG. 24 has a feature that the Hall elements $h_1$, $h_2$ and $h_3$ opposed to the field magnet 11 are arranged at a region where the magnetic field of the field magnet 11 attains the maximum intensity.

The settings shown in FIGS. 24 and 26 have a feature that the MR element 32 is arranged at a position under the stator 1 where an influence by the heat generated by the armature coil is suppressed to the largest extent.

The setting shown in FIG. 25 has a feature that the Hall elements $h_1$, $h_2$ and $h_3$ are arranged at positions under the stator 1 where an influence by the heat generated by the armature coil is suppressed to the largest extent.

The setting shown in FIG. 25 also has a feature that a region where the field magnet 11 provides the magnetic field of the maximum intensity is opposed to the slider SL1.

In any one of the structures shown in FIGS. 24 to 26, it is desired that the Hall elements and the MR element are arranged outside the armature coil for reliably suppressing further the thermal influence by the armature coil.

A linear drive device LMc shown in FIG. 27(A) will now be described below. This linear drive device can be employed instead of the linear drive device LMa or LMb for driving the sliders SL1 or SL2 in the image reading apparatus already described.

The linear drive device LMc includes the stator 1 and the movable piece 20 movably fitted around the stator 1, and is a shaft type linear drive device of a moving coil type.

The stator 1 has the same structure as that of the linear drive device LMa, and is provided with the field magnet 11 and the magnetic encoder scale 31. The field magnet 11 provides the magnetic flux distribution MB shown in FIG. 19.

The movable piece 20 includes an armature coil 210 and a movable piece frame 220 surrounding the armature coil 210, and carries the Hall elements $h_1$, $h_2$ and $h_3$ and the MR element 32. The movable piece 20 can smoothly move on the stator 1 owing to provision of bearings 2210 at the opposite ends of the movable piece frame 220.

The armature coil 210 in this embodiment has two coil groups or sets each of which is formed of three coils, i.e., U-, V- and W-phase coils. The first and second coil groups are arranged in this order along the lengthwise direction of the stator. The first coil group is formed of coils $L_{U1}'$, $L_{V1}'$ and $L_{W1}'$ which are arranged in this order along the lengthwise direction of the stator. The second coil group is formed of coils $L_{U2}'$, $L_{V2}'$ and $L_{W2}'$ which are arranged in this order along the lengthwise direction of the stator.

Each of the coils in these coil sets has a ring-like form, and is fitted around the stator 1. Each coil in this embodiment has a width Pc smaller than ⅓ of the magnetic pole pitch Pm, which is different from the coil of the linear drive device LMa. A spacer S is interposed between the coils neighboring to each other. The center of each coil is shifted from the center of the coil neighboring thereto by ⅓ of Pm. The coils forming the armature coil 210 in this embodiment are fixed together with the spacers S by adhesive coating the outer peripheral surfaces thereof. The armature coil 210 fitted around the stator 1 is accommodated in the hollow frame 220 having a rectangular parallelepiped form, and is supported by the inner peripheral surface of the frame 220.

The Hall elements $h_1$, $h_2$ and $h_3$ are arranged outside the armature coil 21, and are located at a region where the field magnet 11 provides the magnetic field of the maximum intensity, as shown in FIG. 27(A). In other words, the Hall elements $h_1$, $h_2$ and $h_3$ opposed to the field magnet 11 and supported by the inner surface of the frame 220 are located beside the side surface of the stator 1 near the slider SL1.

More specifically, each Hall element opposed to the field magnet 11 is arranged at the following position in the lengthwise direction of the stator. In the lengthwise direction of the stator 1, the Hall element $h_1$ is arranged at the position shifted rightward in FIG. 27(A) from the center of the coil $L_{U1}'$ by Pm/6. Likewise, the Hall element $h_2$ is arranged at the position shifted rightward in FIG. 27(A) from the center of the coil $L_{V1}'$ by Pm/6, and the Hall element $h_3$ is arranged at the position shifted rightward in FIG. 27(A) from the center of the coil $L_{W1}'$ by Pm/6.

The frame 220 of the movable piece 20 carries the magnetic sensor 32 (MR element) at the position opposed to the encoder scale 31. Although the magnetic sensor 32 is arranged inside the armature coil 210, it is located between the coils neighboring to each other and is not located at a region immediately above the coils forming the armature coil. Therefore, an influence by the heat of the armature coil is suppressed, as can be done in the linear drive device LMa including the MR element outside the armature coil.

In this linear drive device LMc, the Hall element $h_3$ and the MR element 32 are arranged on a plane Ys, which contains a central axis Yc of the yawing operation of the movable piece 20 and is perpendicular to the moving direction GO of the movable piece 20 (see FIG. 27(B)).

The yawing operation of the stator is a swing operation Ym of the movable piece 20 shown in FIG. 27(B), which occurs around the axis Yc perpendicular to both of the moving direction GO of the movable piece and the widthwise direction WD of the slider. This yawing may occur as follows. When the movable piece 20 which is connected to one end of the slider SL1 or SL2 drives the slider, the other end of the slider tends to move more slowly than the one connected to the movable piece due to an inertial force of the slider and a moving resistance applied to the other end of the slider. Thereby, the yawing Ym may occur around the central axis defined by the axis Yc.

The linear drive device LMc is driven by electric circuits similar to those for the linear drive device LMa.

The linear drive device LMc described above can achieve the same advantages as those already described in connection with the linear drive device LMa. The linear drive device LMc further has such a feature that the MR element 32 opposed to the encoder scale 31 is arranged at the plane Ys containing the central axis Yc of the yawing of the movable piece, the Hall element $h_3$ is arranged at the plane Ys (although it is only one among the three Hall elements), and the Hall element $h_2$ is located near the plane Ys. Accordingly, even if the yawing of the movable piece 20 occurs, such disadvantages as deviation and instability can be suppressed by the positional relationship between the MR element 32 and the scale 31 (e.g., a distance between them in this embodiment) as well as the positional relationship of the Hall elements $h_3$ and $h_2$ with respect to the field magnet 11. Thereby, the linear drive device can be driven accurately and smoothly under the control.

Description will now be given on the linear drive devices LMd and LMe shown in FIGS. 28 and 30, respectively.

Each of these linear drive devices can be employed instead of the linear drive device LMa or LMb, and can be used for driving the slider SL1 or SL2 in the image reading apparatus.

Figure 28:
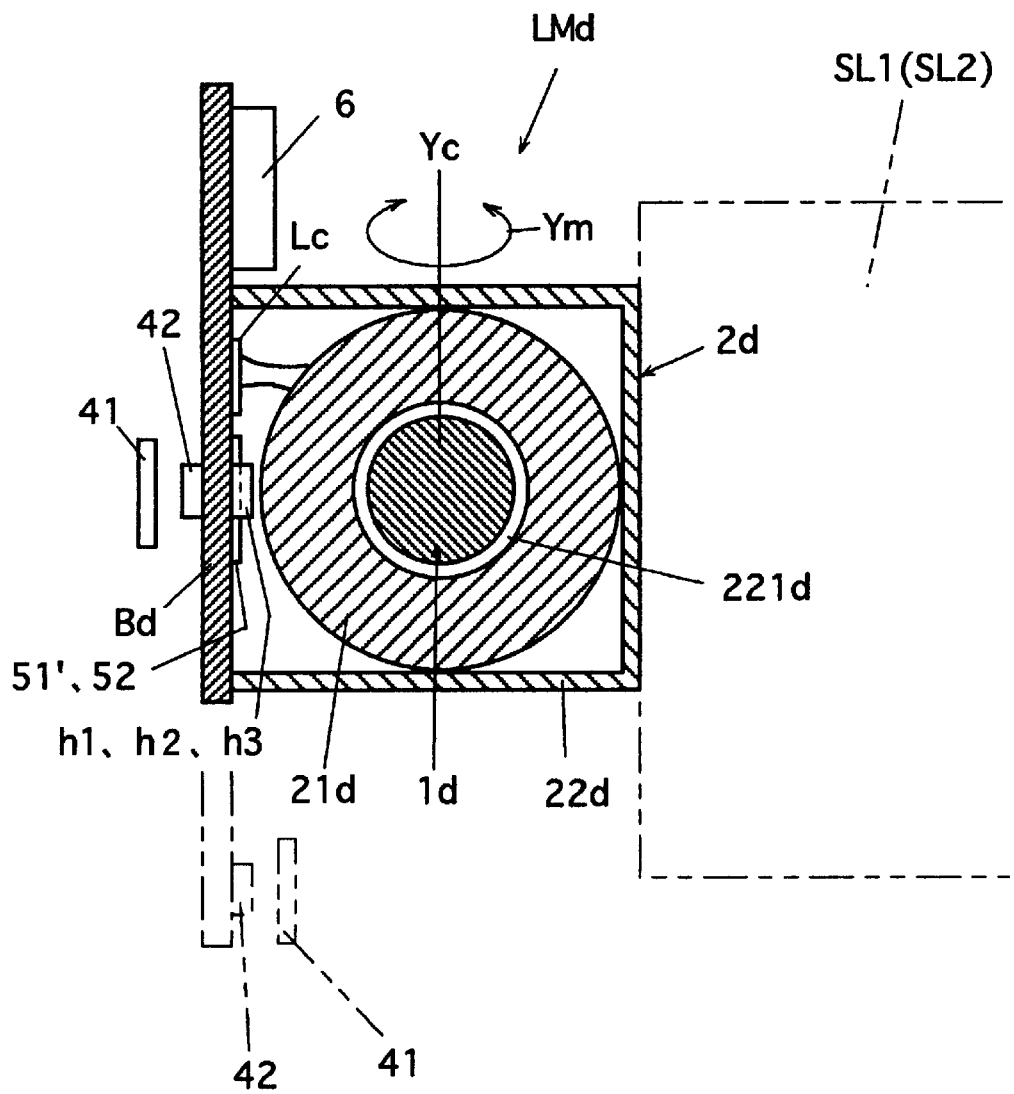
FIG. 28 is a schematic cross section of a linear drive device of a further embodiment of the invention.

The linear drive device LMd shown in FIG. 28 includes a stator 1d and a movable piece 2d fitted around the stator 1d, and therefore is a shaft type linear drive device of a moving coil type.

The stator 1d is provided with the field magnet formed by magnetizing a magnetizable shaft member. The magnetic field of the field magnet provides the magnetic flux distribution which is substantially uniform over the entire circumference of the stator. The magnetic encoder scale is not formed on the stator 1d. Except for these structures, the stator 1d is the same as the stator 1 of the linear drive device LMa.

The movable piece 2d has an armature coil 21d and a movable piece frame 22d surrounding the armature coil 21d. The armature coil 21d has the same structure as the armature coil 21 of the drive device LMa.

The movable piece frame 22d has an opening at a side opposite to the side connected to the slider SL1 (or SL2), and a board Bd is arranged at the opening. In the figure, 221d indicates a bearing arranged at the frame 22d forming a slidable guide along the stator 1d.

The board Bd carries the Hall elements $h_1$, $h_2$ and $h_3$ which establish the same electrical and positional relationships as those in the motor LMa with respect to the armature coil 21d. The Hall elements $h_1$, $h_2$ and $h_3$ are located outside the armature coil 21d, are opposed to the lateral side of the field magnet remote from the connection to the slider, and are supported on the inner surface of the board Bd.

A photosensor 42 for an optical encoder is carried at a position on the outer surface of the board Bd which is immediately opposite to the position of the Hall element. An optical encoder scale 41 extending in the moving direction of the movable piece is arranged at a position opposed to the photosensor 42 and supported by a supporting member which is not shown.

At least one of the Hall elements and the photosensor 42 are arranged on or near the plane including the center Yc of the yawing operation Ym of the movable piece 2d and perpendicular to the stator 1d.

Figure 29:
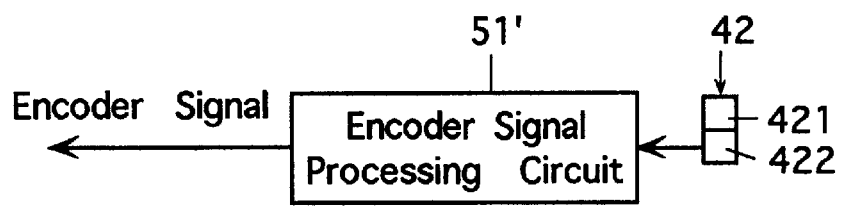
FIG. 29 is a block diagram showing a photosensor and an encoder signal processing circuit used in the linear drive device shown in FIG. 28.

The linear drive device LMd can be operated by a power supply control circuit which is the same as that for the linear drive device LMa shown in FIGS. 20 and 21 except that the magnetic sensor (MR element) 32 and the encoder signal processing circuit 51 in the circuit shown in FIGS. 20 and 21 are replaced with the photosensor 42 and an encoder signal processing circuit 51' respectively shown in FIG. 29.

The motor drive control circuit 6, encoder signal processing circuit 51', field magnet signal processing circuit 52 and other elements in the above circuitry are mounted on the inner surface of the board Bd. A circuit pattern Lc for star-connection of the coil groups forming the armature coil 21d is also mounted on the board Bd.

It is desired that circuits on the board Bd which generate significant heat or are provided with a radiator plate are arranged at positions which can suppress the thermal influence thereof on the Hall elements and the photosensor. In the illustrated embodiment, the motor drive control circuit 6 and the circuit pattern Lc are arranged at a higher level than the Hall elements $h_1$, $h_2$ and $h_3$ and the photosensor 42, and the other circuits 51' and 52 are laterally spaced from the sides of the Hall elements.

As represented by the lines of alternate long and two short dashes, the board Bd may have a downward extension for arranging the photosensor 42 on the inner surface of the extension, in which case the optical encoder scale 41 is opposed thereto. This allows a single surface board structure.

In any one of the above structures, the encoder scale 41 in this embodiment is formed of surfaces having high and low reflectivities and arranged alternately in the lengthwise direction of the stator. In this embodiment, these two kinds of surfaces having different reflectivities are arranged at a pitch of 100 μm in the lengthwise direction of the stator. The photosensor 42 includes a light emitting element (light emitting diode in this embodiment) 421 emitting light beams to the encoder scale 41, and a photodiode 422 which is a kind of photoelectric conversion element receiving the light beams emitted from the light emitting element 421 and reflected by the scale 41, and issuing an electric signal corresponding to a quantity of the received light. The encoder signal processing circuit 51' binarizes (digitizes) the output signal of the photodiode 422.

Figure 30:
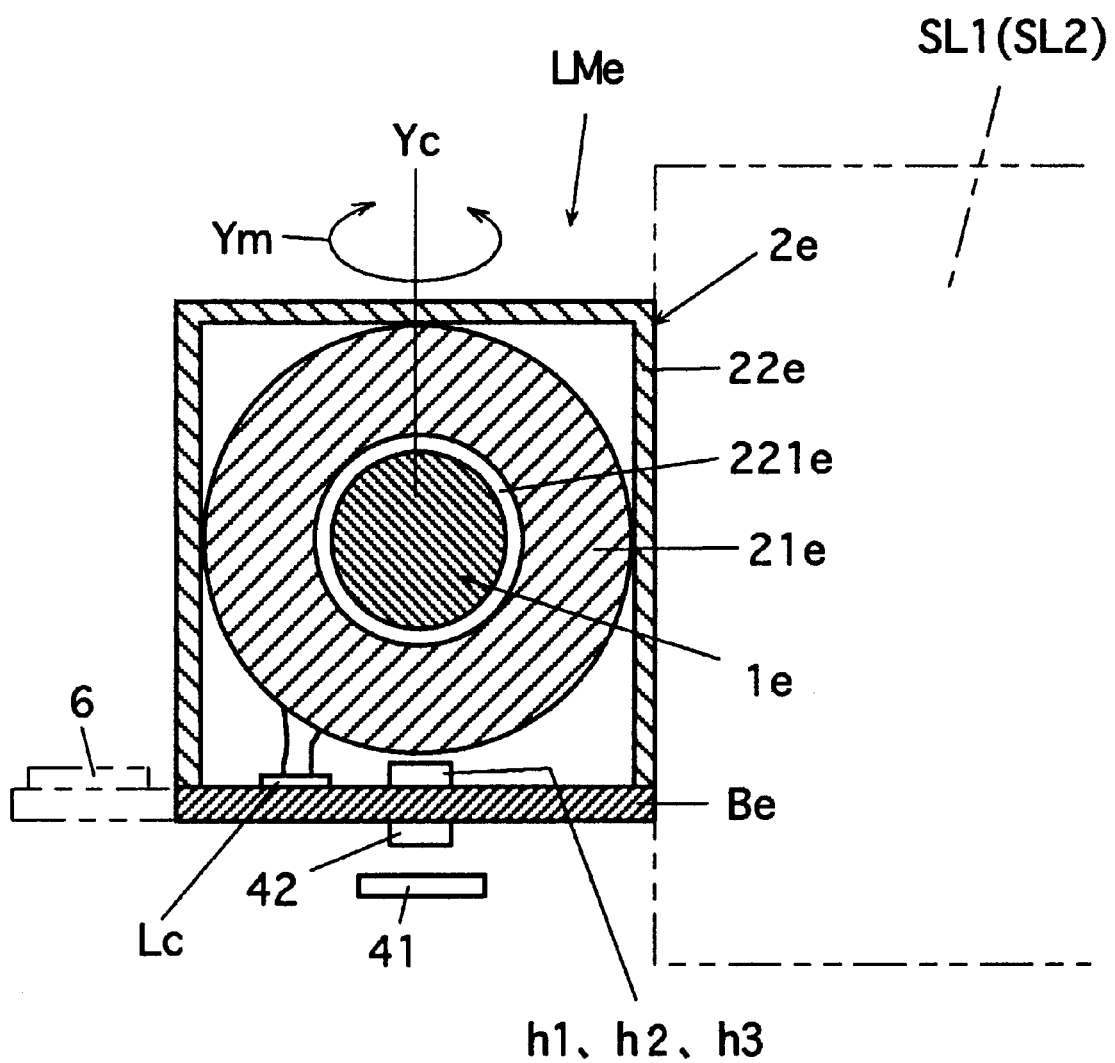
FIG. 30 is a schematic cross section of a linear drive device of a further embodiment of the invention.

The linear drive device LMe shown in FIG. 30 includes a stator 1e and a movable piece 2e fitted around the stator 1e, and therefore is a shaft type linear drive device of a moving coil type.

The stator 1e has the same structure as the stator 1d shown in FIG. 28.

The movable piece 2e has the same structure as the movable piece 2d shown in FIG. 28 except for that a movable piece frame 22e has an opening at a lower surface perpendicular to the side surface connected to the slider SL1 (or SL2). A board Be is arranged in the opening. In the figure, 221e indicates a bearing arranged at the frame 22e forming a slidable guide along the stator 1e.

The board Be carries the Hall elements $h_1$, $h_2$ and $h_3$ which establish the same electrical and positional relationships as those in the motor LMa with respect to the armature coil 21e. The Hall elements $h_1$, $h_2$ and $h_3$ opposed to the field magnet are located under the armature coil 21e, and are supported on the inner surface of the circuit-board Be.

The photosensor 42 for the optical encoder is carried at a position on the outer (lower) surface of the board Be which is immediately opposite to the position of the Hall element. The optical encoder scale 41 extending in the moving direction of the movable piece is arranged at a position opposed to the photosensor 42 and supported by a supporting member which is not shown.

At least one of the Hall elements and the photosensor 42 are arranged on or near the plane including the center Yc of the yawing operation Ym of the movable piece 2e and perpendicular to the stator 1e.

The linear drive device LMe can be likewise operated by the power supply control circuit which is the same as that for the linear drive device LMd.

The circuit pattern Lc for star-connection of the coil groups forming the armature coil 21e is mounted on the inner surface of the board Be, and the motor drive control circuit 6, encoder signal processing circuit 51', field magnet signal processing circuit 52 and other components may be additionally mounted on the inner surface of the board Be. However, the circuits among those described above, which generate significant heat or are provided with a radiator plate may be arranged at a laterally extended portion of the board Be shown by the lines of alternate long and two short dashes in FIG. 30, for suppressing a thermal influence by them on the Hall elements and the photosensor.

In the linear drive devices LMd and LMe, the Hall elements $h_1$, $h_2$ and $h_3$, as well as the photosensor 42, which may be affected by the heat, causing deterioration, lowering of the performance and a malfunction, are arranged at the regions opposed to the side and/or lower surfaces of the stator, i.e., the regions other than the regions above the upper surfaces of the stators 1d and 1e which are subjected to the maximum heat generated by the armature coils 21d and 21e. Further, they are arranged outside the armature coils 21d and 21e. Therefore, they hardly receive the influence of the heat generated by the armature coils 21d and 21e even if the linear drive devices LMd and LMe operate for a long time, and a predetermined information sensing accuracy can be maintained, so that the linear drive devices LMd and LMe can operate accurately and smoothly with an improved reliability.

Since the photosensor 42 can sense the information on the scale 41 without an influence by the magnetism of the field magnet, the magnetization for forming the field magnet can be performed easily and inexpensively, and also the sensor 42 can sense the scale information with a high accuracy, which also enables the accurate and smooth operation of the linear drive devices LMd and LMe with a high reliability.

Although it is only one of the three Hall elements, the Hall element and the photosensor 42 are arranged on or near the plane extending through the center Yc of the yawing operation of the movable pieces 2d or 2e. Therefore, it is possible to suppress deviation and instability in the positional relationships between the sensor 42 and the scale 41, and between the Hall elements and the field magnet 11, even when the movable piece 2d or 2e yaws. This enables further accurate and smooth driving of the linear drive device under the control.

Since the optical encoder scale 41 is arranged at a region which is effectively protected from the heat of the armature coil, it can be made of an inexpensive material, i.e., resin.

In each of the linear drive devices LMd and LMe, the optical encoder (41 and 42) may be replaced with a magnetic encoder (e.g., the MR element 32 and the magnetic scale 31 already described).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A linear motor of a shaft type comprising:

a shaft-like member having a field magnet;

a cylindrical armature coil fitted around said shaft-like member; and at least one magnetism sensing device for sensing a magnetism, said magnetism sensing device producing an output for obtaining therefrom a signal for driving the motor or a signal for controlling an operation of the motor, wherein a magnetic shield device is provided for said magnetism sensing device for intercepting or suppressing an operation by a magnetism other than the magnetism to be sensed by said magnetism sensing device.

2. The linear motor of the shaft type according to claim 1, wherein said shaft-like member is provided with a magnetized portion for producing a position signal in addition to said field magnet, said magnetism sensing device provided with said magnetic shield device is a position signal sensing device, and said magnetic shield device is arranged near said position signal sensing device.

3. The linear motor of the shaft type according to claim 1, wherein said magnetism sensing device provided with said magnetic shield device is a field magnet magnetic pole sensing device for producing a drive signal for switching power supply to said armature coil in accordance with an output thereof, and said magnetic shield device is arranged near said field magnet magnetic pole sensing device.

4. A linear drive device comprising:

a stator having a magnetized portion for drive and a magnetized portion for position sensing, and extending in a given direction;

a movable piece having an armature coil opposed to said magnetized portion for drive and being reciprocatively movable along said stator;

a magnetic sensor being moved together with said movable piece for reading magnetic information held by said magnetized portion for position sensing; and a magnetic shield member provided for said magnetic sensor for shielding a magnetic flux emitted from said magnetized portion for drive.

5. The linear drive device according to claim 4, wherein said magnetic shield member is made of a ferromagnetic material.

6. The linear drive device according to claim 4, wherein an edge of said magnetic shield member opposed to said stator has such a section in a direction crossing the moving direction of said movable piece such that said edge follows a contour of the section of the portion of the stator opposed to said edge of said magnetic shield member.

7. The linear drive device according to claim 4, wherein said magnetic shield member comprises magnetic shield members, said magnetic shield members are arranged at the front and rear, in the moving direction of said movable piece, of said magnetic sensor, and each of said magnetic shield members at the front and rear of said magnetic sensor has such a form that the thickness decreases as the position moves away from said magnetic sensor.

8. The linear drive device according to claim 4, wherein said magnetic shield member comprises magnetic shield members, said magnetic shield members are arranged at the front and rear, in the moving direction of said movable piece, of said magnetic sensor, and each of said magnetic shield member at the front and rear of said magnetic sensor has such a form that an end thereof remote from said magnetic sensor in the moving direction of said movable piece extends obliquely with respect to said magnetized portion for position sensing.

9. The linear drive device according to claim 4, wherein said stator is provided with at least one plane portion extending in the lengthwise direction of said stator, and said magnetized portion for position sensing is formed by magnetization at said plane portion.

10. The linear drive device according to claim 4, wherein a driven object to be driven linearly in a drive direction is connected at one of its opposite ends spaced from each other in a direction crossing said drive direction to said movable piece, and said magnetic sensor is arranged on or near a central axis of a yawing operation of said movable piece.

11. The linear drive device according to claim 4, wherein a driven object to be driven linearly in a drive direction is connected at one of its opposite ends spaced from each other in a direction crossing said drive direction to said movable piece, and said driven object is a slider arranged in an image reading apparatus and carrying an optical part for reading an original image.

12. A linear drive device according to claim 4 wherein said magnetic shield member is arranged at the front and rear, in the moving direction of said moveable piece, of said magnetic sensor.

13. A linear drive device comprising:

A stator having a magnetized portion for drive and a magnetized portion for position sensing, and extending in a given direction;

a movable piece having an armature coil opposed to said magnetized portion for drive and being reciprocatively movable along said stator;

a magnetic sensor being moved together with said movable piece for reading magnetic information held by said magnetized portion for position sensing;

a magnetic shield member provided for said magnetic sensor for shielding a magnetic flux emitted from said magnetized portion for drive;

said magnetic shield member being arranged only at the front and rear, in the moving direction of said movable piece, of said magnetic sensor.

14. A linear drive device comprising:

a stator having a magnetized portion for drive and a magnetized portion for position sensing, and extending in a given direction;

a movable piece having an armature coil opposed to said magnetized portion for drive and being reciprocatively movable along said stator;

a magnetic sensor being moved together with said movable piece for reading magnetic information held by said magnetized portion for position sensing;

a magnetic shield member provided for said magnetic sensor for shielding a magnetic flux emitted from said magnetized portion for drive;

said magnetic shield member being arranged in a form surrounding said magnetic sensor.

15. A linear drive device comprising:

a stator having a magnetized portion for drive and a magnetized portion for position sensing, and extending in a given direction;

a movable piece having an armature coil opposed to said magnetized portion for drive and being reciprocatively movable along said stator;

a magnet sensor being moved together with said movable piece for reading magnetic information held by said magnetized portion for position sensing;

a magnet shield member provided for said magnetic sensor for shielding a magnetic flux emitted from said magnetized portion for drive;

said stator being provided with two grooves in the lengthwise direction of said stator, said magnetized portion for position sensing is formed by magnetization between said two grooves, and said magnetic shield member has a portion fitted into said groove and being movable along said groove.

16. A linear drive device comprising:

a stator having a magnetized portion for drive and a magnetized portion for position sensing, and extending in a given direction;

a movable piece having an armature coil opposed to said magnetized portion for drive and being reciprocatively movable along said stator;

a magnetic sensor being moved together with said movable piece for reading magnetic information held by said magnetized portion for position sensing;

a magnetic shield member provided for said magnetic sensor for shielding a magnetic flux emitted from said magnetized portion for drive;

said magnetized portions for drive and position sensing are arranged on said stator such that an offset variation in output signal of said magnetic sensor does not exceed 38% of the peak-to-peak value of the output signal of said magnetic sensor.

17. A linear drive device comprising:

a stator having a field magnet provided with N- and S-type magnetic poles arranged alternately to each other, and extending in a given direction;

a movable piece having an armature coil fitted over said stator and opposed to said field magnet, and being reciprocatively movable along said stator;

a first sensor provided at said movable piece and opposed to said field magnet for sensing a variation in magnetic polarity of said field magnet;

an encoder scale arranged in a reciprocatively moving direction of said movable piece; and a second sensor provided at said movable piece and opposed to said encoder scale for reading information on said encoder scale, wherein said first and second sensors are arranged at a region around said stator excluding a region above an upper surface of said stator.

18. The linear drive device according to claim 17, wherein said first and second sensor are arranged outside said armature coil.

19. The linear drive device according to claim 17, wherein said encoder scale is a magnetic encoder scale, and said second sensor is a magnetic sensor for reading magnetic information on said encoder scale.

20. The linear drive device according to claim 19, wherein said first sensor opposed to said field magnet is located beside one side surface of said stator, said encoder scale is arranged at the other side surface of said stator, and said second sensor opposed to said encoder scale is located beside the other side surface of said stator.

21. The linear drive device according to claim 19, wherein said first sensor opposed to said field magnet is located under the lower surface of said stator, said encoder scale is arranged at the side surface of said stator, and said second sensor opposed to said encoder scale is located beside the side surface of said stator.

22. The linear drive device according to claim 19, wherein said encoder scale is arranged at the lower surface of said stator, said first sensor opposed to said field magnet is located beside the side surface of said stator, and said second sensor opposed to said encoder scale is located under the lower surface of said stator.

23. The linear drive device according to claim 19, wherein said field magnet is formed such that a region providing the maximum intensity of the magnetic field produced by said field magnet and a region providing the minimum intensity of the magnetic field produced by said field magnet are formed in a region around said stator except for a region above the upper surface of said stator, said first sensor arranged at said movable piece and opposed to said field magnet is located in said region providing the maximum intensity of the magnetic field, the magnetic encoder scale is formed at said stator and is located in said region providing the minimum intensity of the magnetic field, and said second sensor arranged at said movable piece is opposed to said encoder scale.

24. The linear drive device according to claim 20, wherein said field magnet is formed to attain the maximum intensity of the magnetic field at a position beside said one side surface of said stator and the minimum intensity of the magnetic field at a position beside said other side surface of said stator.

25. The linear drive device according to claim 22, wherein said field magnet is formed so as to attain the maximum intensity of the magnetic field at each of positions beside the opposite side surfaces of said stator and the minimum intensity of the magnetic field at a position under said lower surface of said stator.

26. The linear drive device according to claim 17, wherein said movable piece is provided with a board arranged laterally outside said armature coil, said first sensor opposed to said field magnet is mounted on said board and is located laterally outside said armature coil, said second sensor is mounted on said board, and said encoder scale is arranged at a position opposed to said second sensor.

27. The linear drive device according to claim 26, wherein said board is provided with one or more circuit portions for energizing said armature coil to drive said movable piece, and said first and second sensors are arranged at a region on said board other than a region above said circuit portion.

28. The linear drive device according to claim 17, wherein said movable piece is provided with a board arranged under said armature coil, said first sensor opposed to said field magnet is mounted on said board and is located under said armature coil, said second sensor is mounted on said board, and said encoder scale is arranged at a position opposed to said second sensor.

29. The linear drive device according to claim 17, wherein a driven object to be driven linearly in a predetermined drive direction is connected at one of its opposite ends spaced from each other in a direction crossing said drive direction to said movable piece, and at least said second sensor between said first and second sensors is arranged on or near a central axis of a yawing operation of said movable piece.

30. The linear drive device according to claim 17, wherein a driven object to be driven linearly in a predetermined drive direction is connected at one of its opposite ends spaced from each other in a direction crossing said drive direction to said movable piece, and said driven object is a slider arranged in an image reading apparatus and carrying an optical part for reading an original image.

* * * * *